BEST AVAILABLE COPY

Sept. 7, 1926.  1,598,908
C. A. HAMMOND-KNOWLTON
SKEINING AND ASSEMBLING MACHINE
Filed April 10, 1923    23 Sheets-Sheet 2

WITNESSES
Oliver W. Holmes
A. L. Kitchin

INVENTOR
C. A. HAMMOND-KNOWLTON
BY
ATTORNEYS

Sept. 7, 1926.

C. A. HAMMOND-KNOWLTON 1,598,908

SKEINING AND ASSEMBLING MACHINE

Filed April 10, 1923      23 Sheets-Sheet 6

Sept. 7, 1926.

C. A. HAMMOND-KNOWLTON 1,598,908

SKEINING AND ASSEMBLING MACHINE

Filed April 10, 1923    23 Sheets-Sheet 7

WITNESSES

INVENTOR
C. A. Hammond-Knowlton
BY
ATTORNEY

Sept. 7, 1926.

C. A. HAMMOND-KNOWLTON 1,598,908

SKEINING AND ASSEMBLING MACHINE

Filed April 10, 1923    23 Sheets-Sheet 12

WITNESSES
Oliver W. Holmes
A. L. Kitchin

INVENTOR
C. A. Hammond-Knowlton
BY Munn & Co.
ATTORNEYS

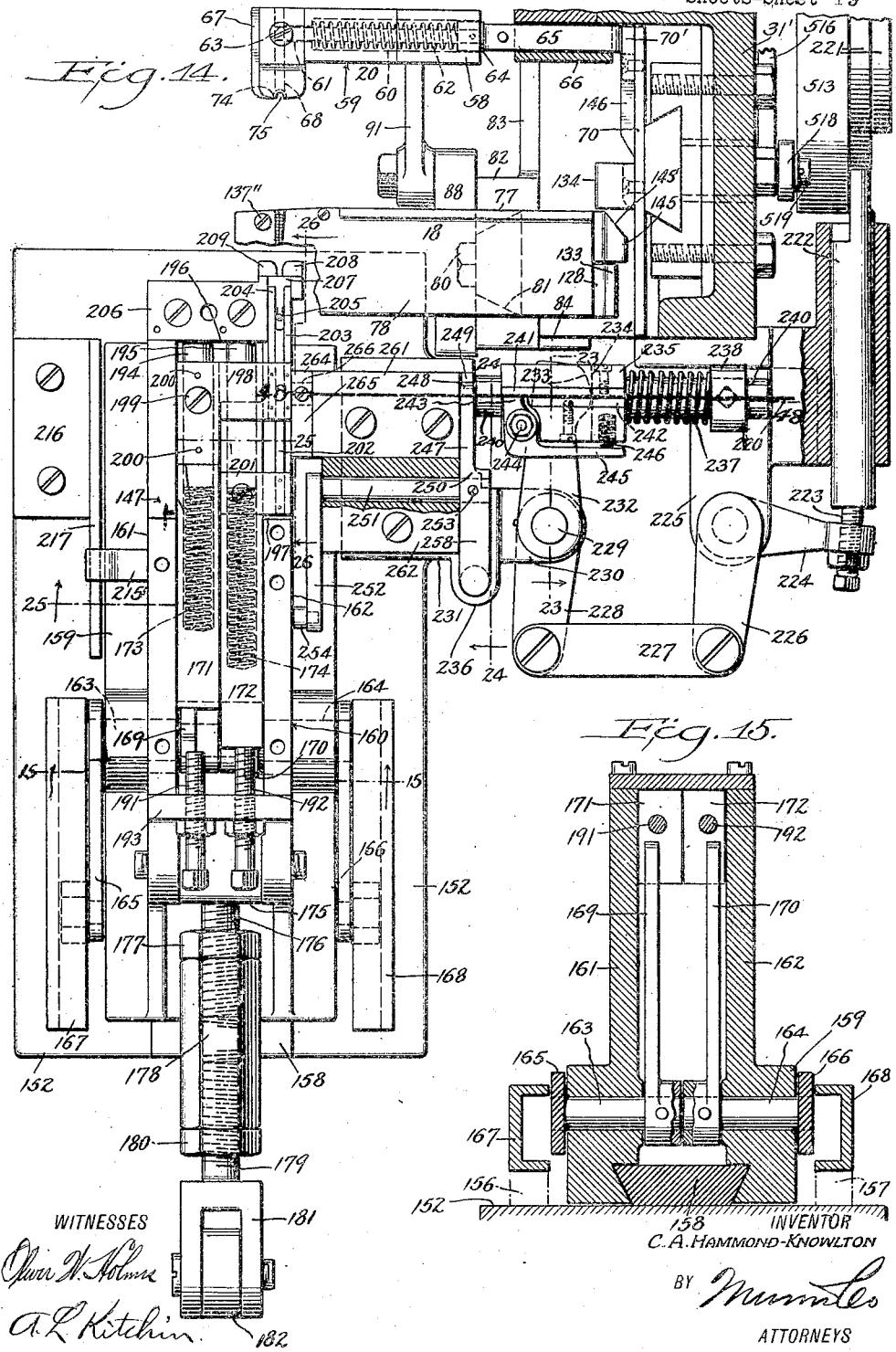

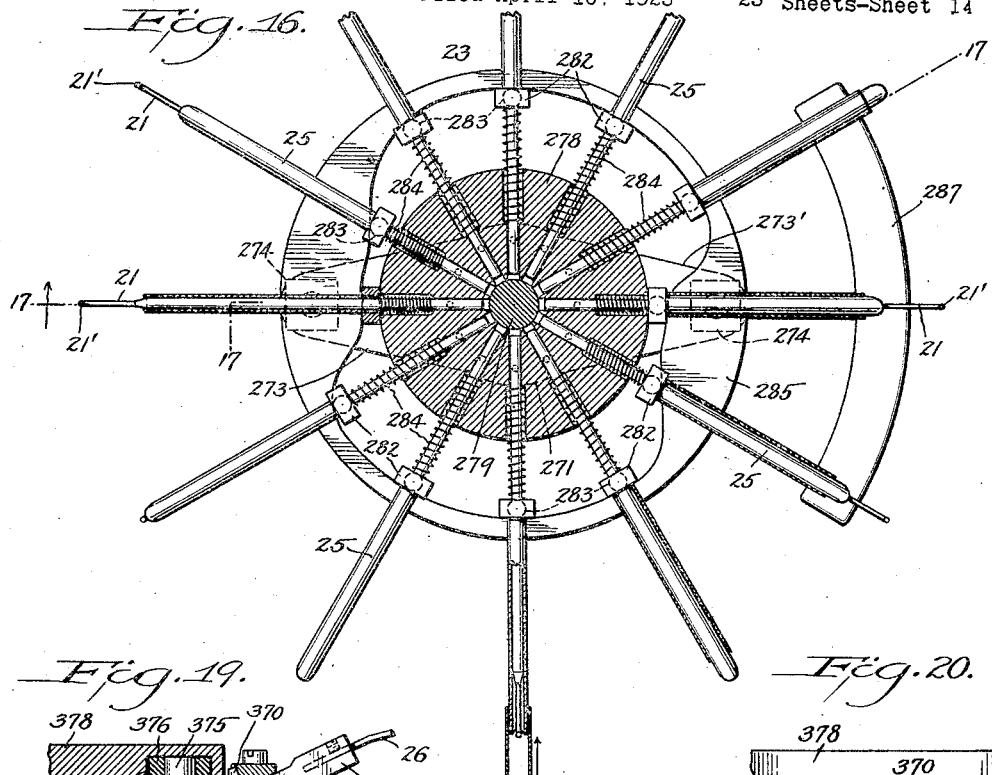

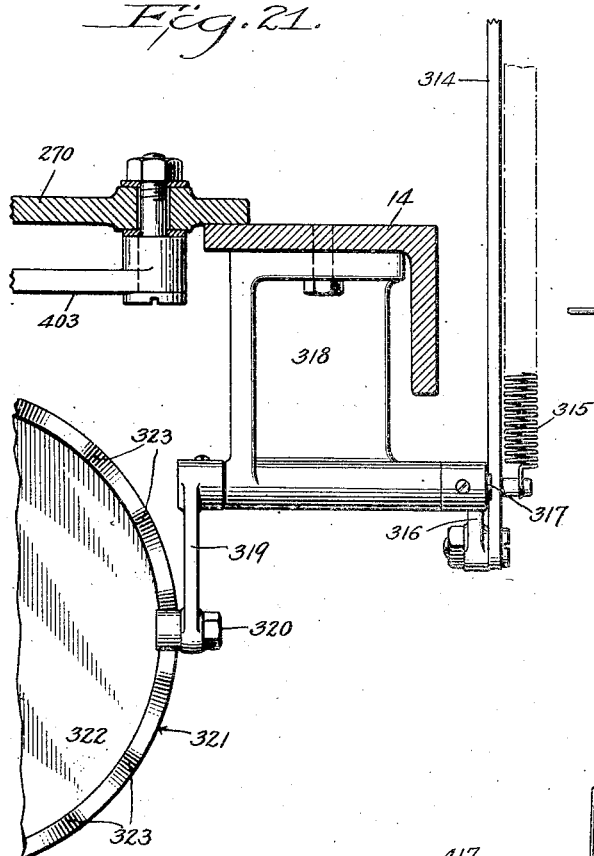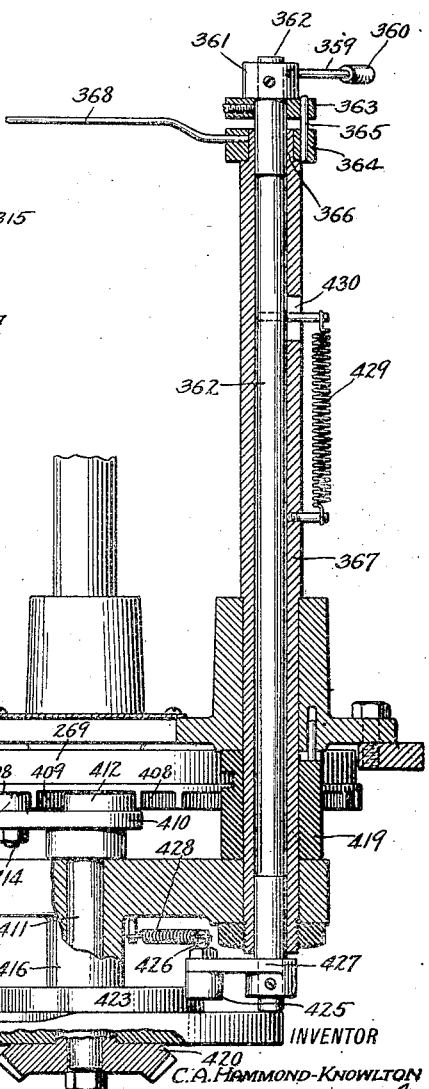

Sept. 7, 1926. 1,598,908
C. A. HAMMOND-KNOWLTON
SKEINING AND ASSEMBLING MACHINE
Filed April 10, 1923 23 Sheets-Sheet 16
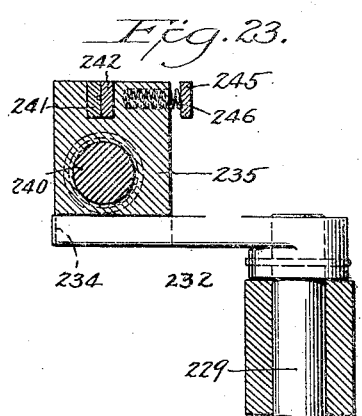
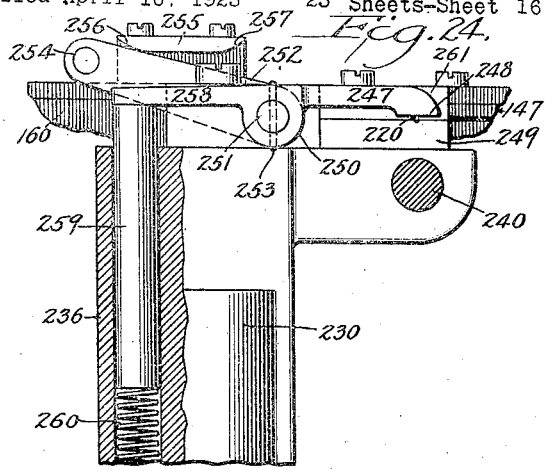
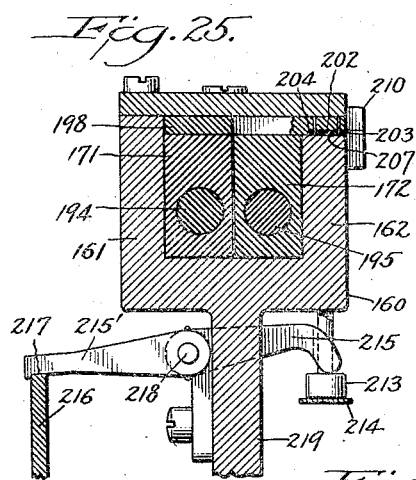
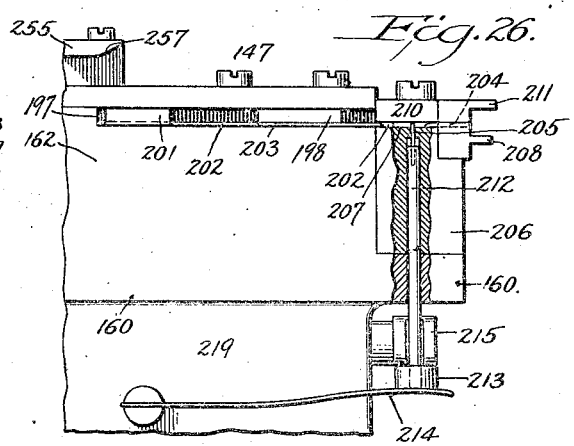
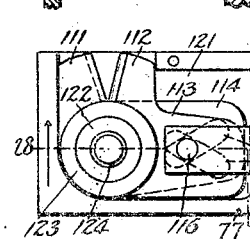
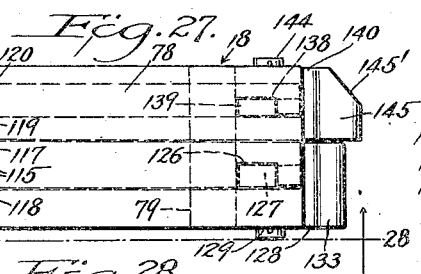
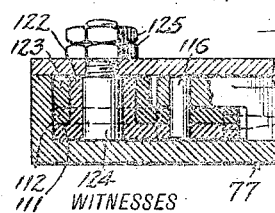
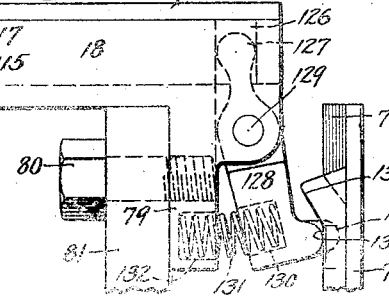
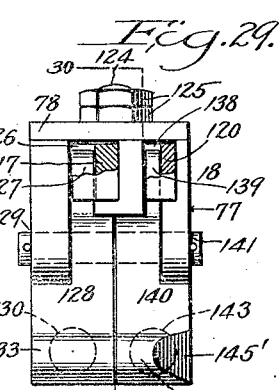
WITNESSES
Oliver W. Holmes
A. L. Kitchin
INVENTOR
C. A. Hammond-Knowlton
BY
ATTORNEYS

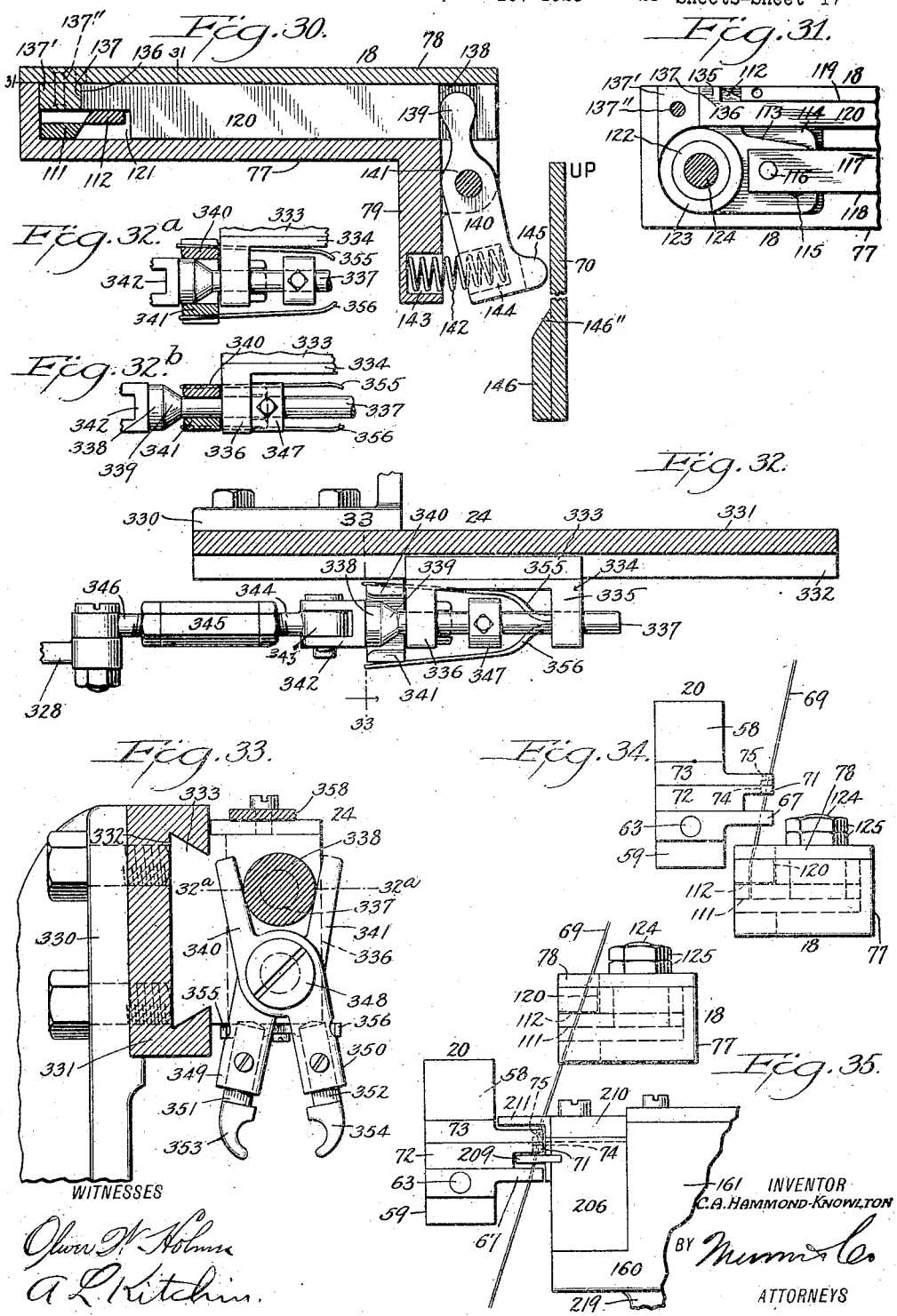

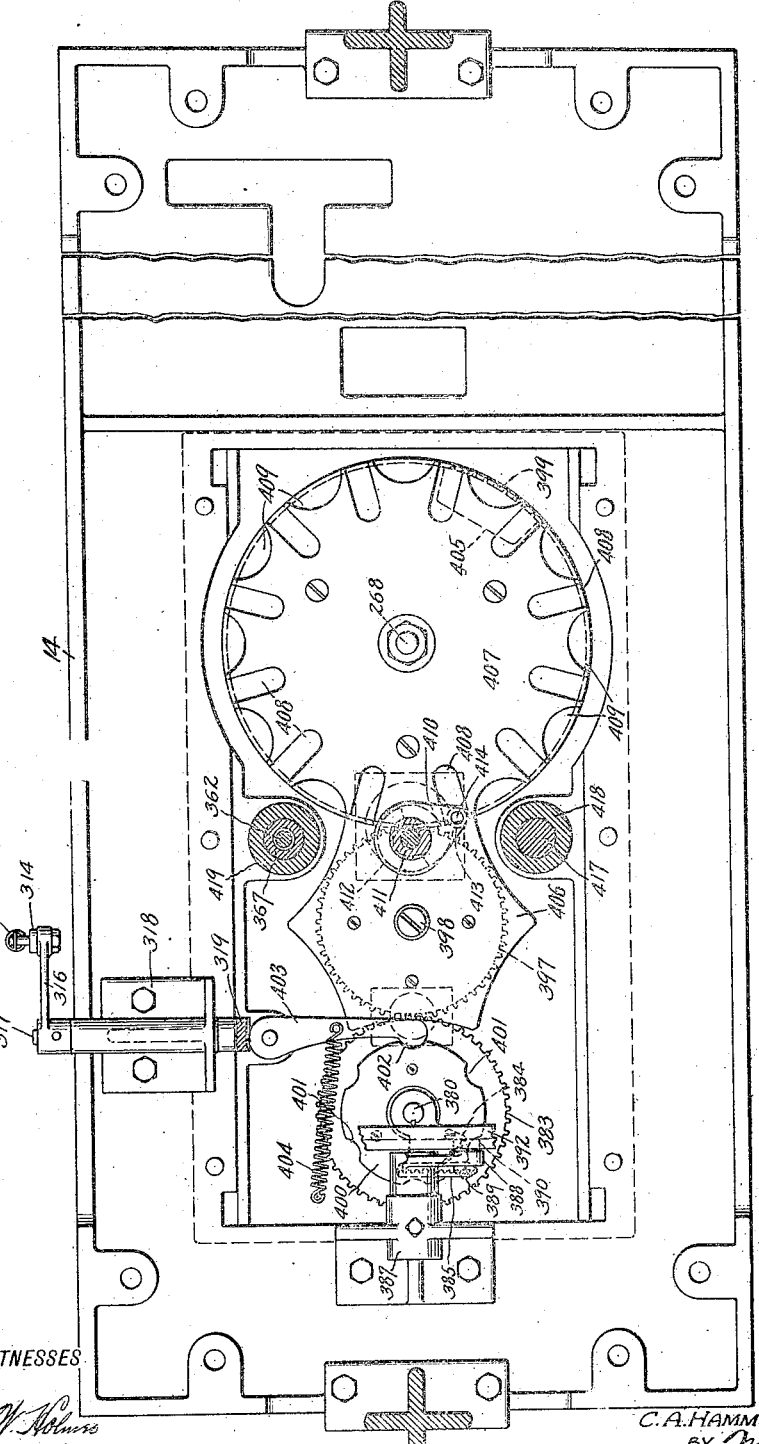

Sept. 7, 1926.
C. A. HAMMOND-KNOWLTON
SKEINING AND ASSEMBLING MACHINE
Filed April 10, 1923    23 Sheets-Sheet 19
1,598,908
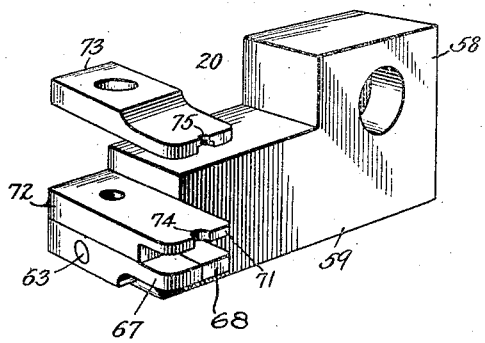
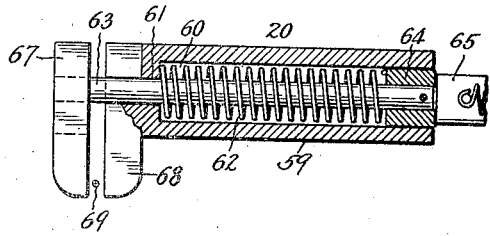
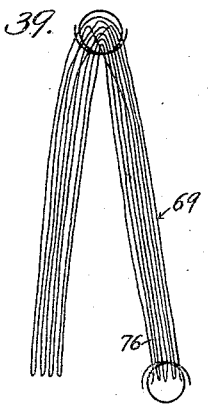
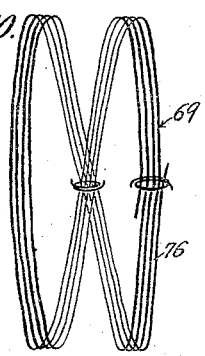
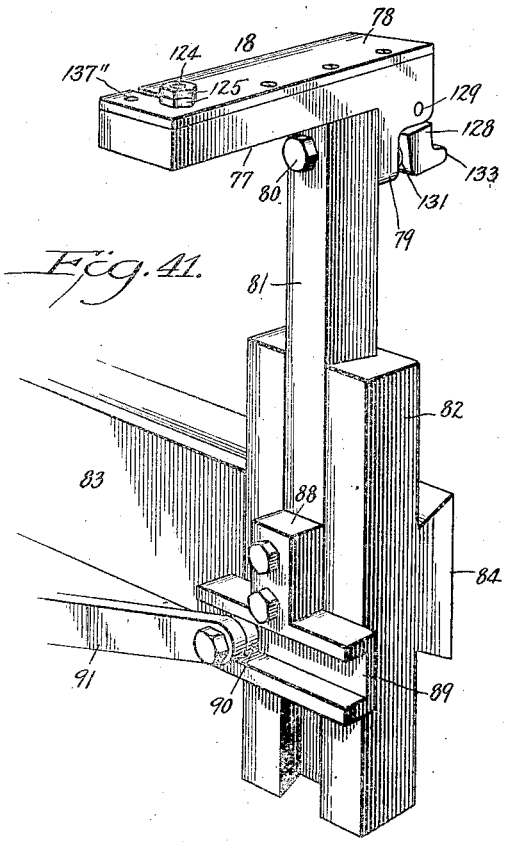
WITNESSES
INVENTOR
C. A. HAMMOND-KNOWLTON
ATTORNEYS Sept. 7, 1926.  C. A. HAMMOND-KNOWLTON  1,598,908
SKEINING AND ASSEMBLING MACHINE
Filed April 10, 1923  23 Sheets-Sheet 20
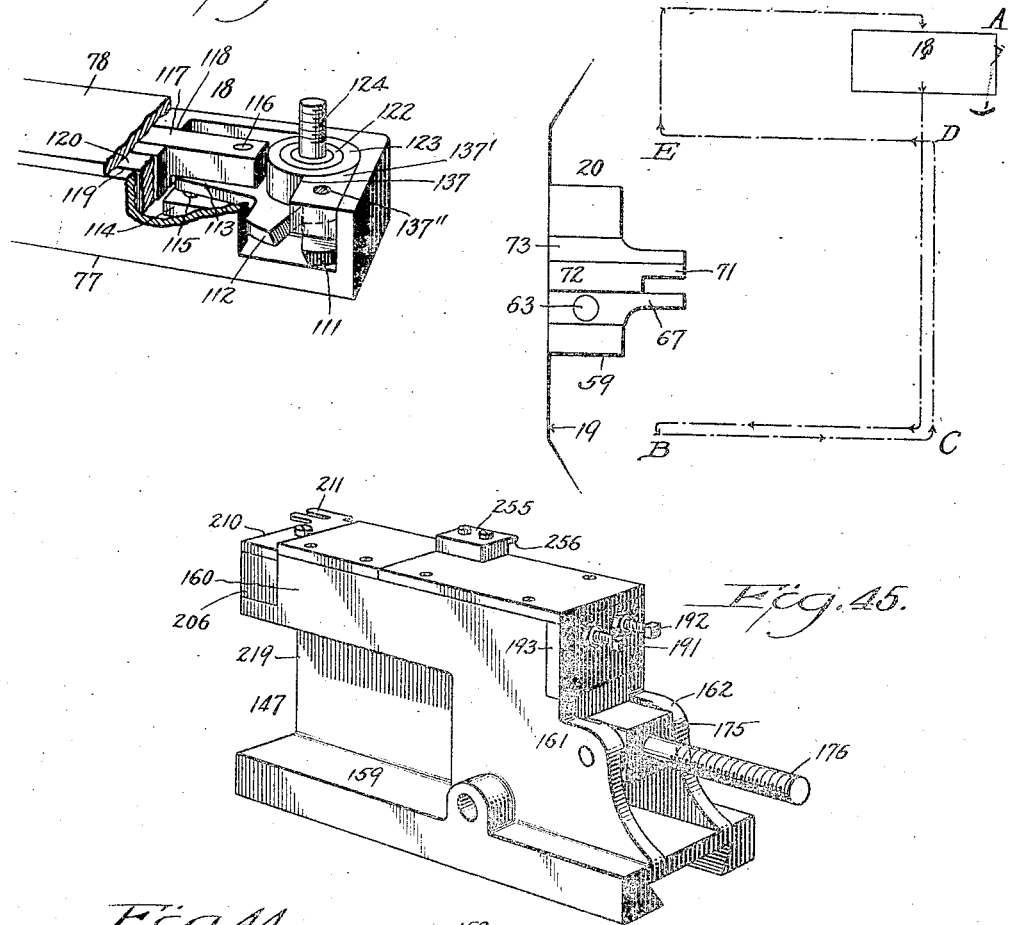
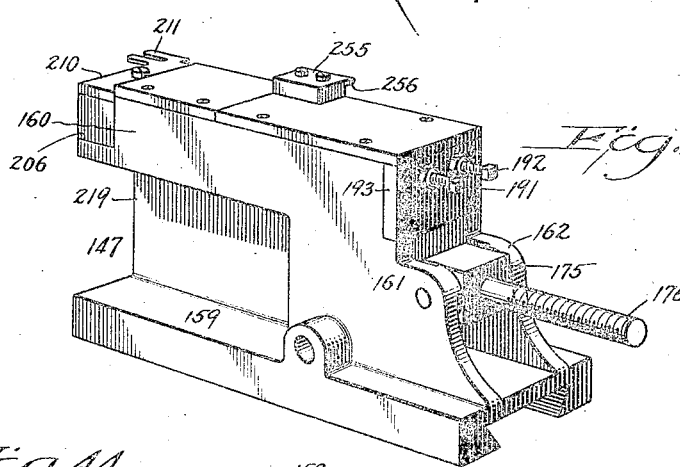
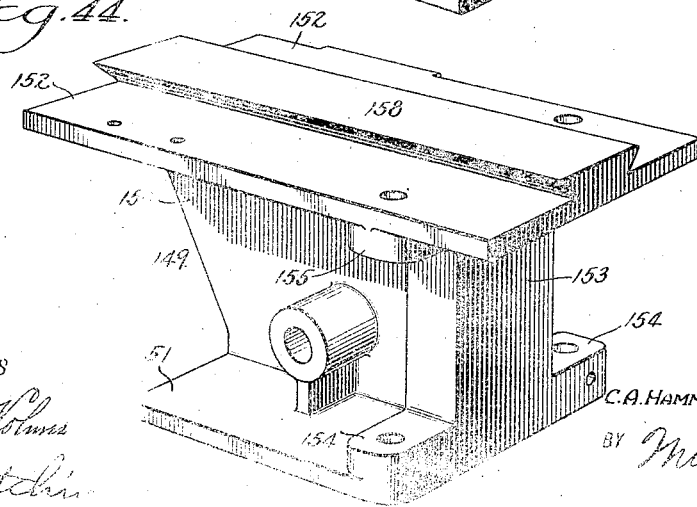
WITNESSES
INVENTOR
C. A. HAMMOND-KNOWLTON
BY
ATTORNEYS Sept. 7, 1926. 1,598,908
C. A. HAMMOND-KNOWLTON
SKEINING AND ASSEMBLING MACHINE
Filed April 10, 1923 23 Sheets-Sheet 21
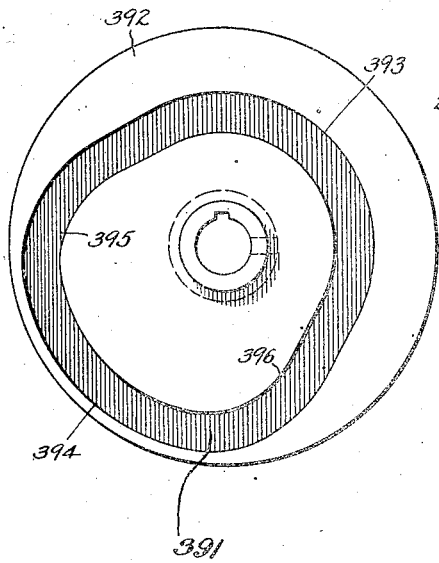
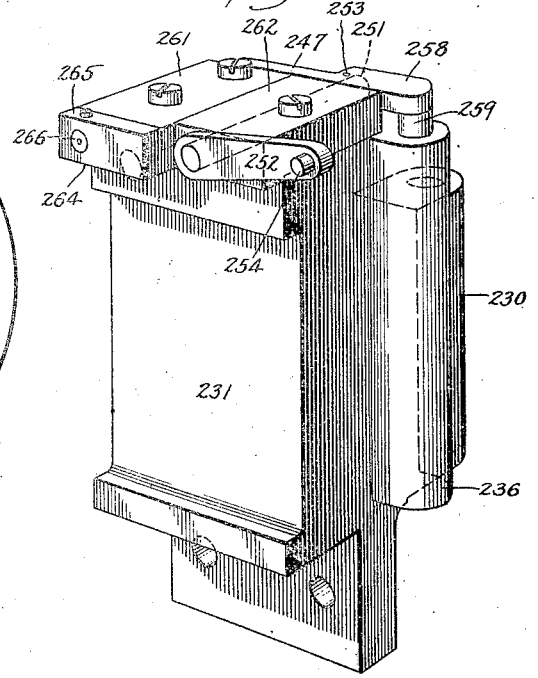
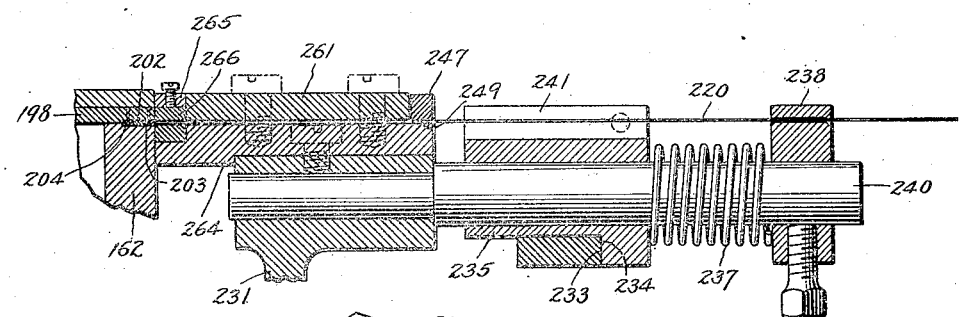
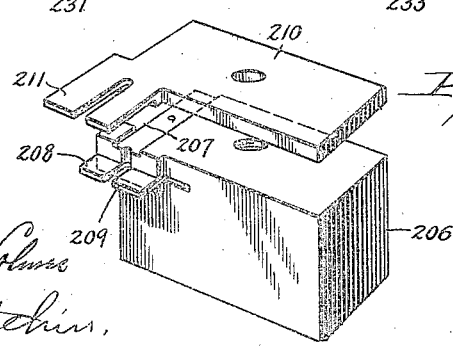
WITNESSES
INVENTOR
C. A. HAMMOND-KNOWLTON
BY
ATTORNEYS

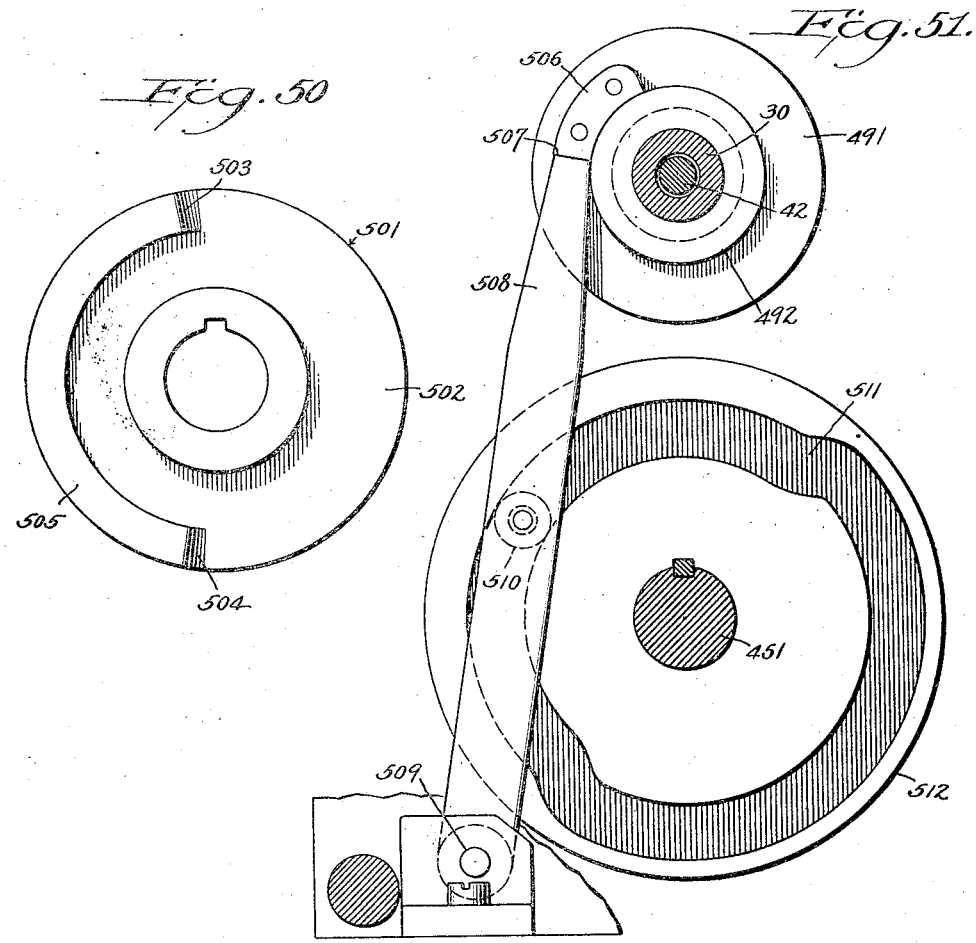
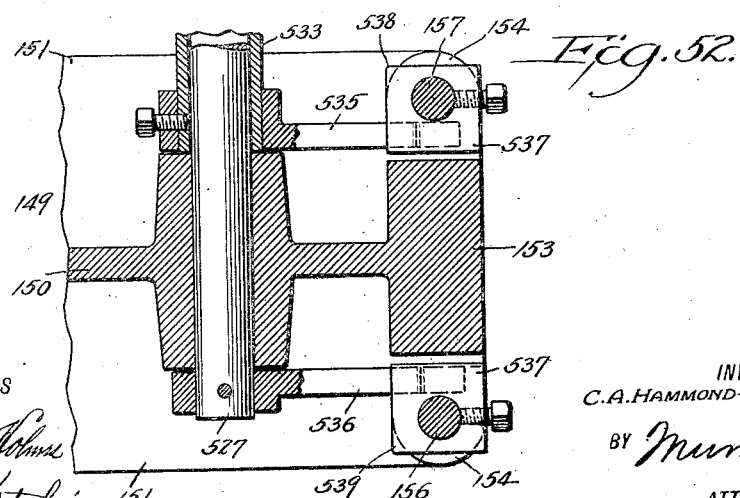

Sept. 7, 1926.  
C. A. HAMMOND-KNOWLTON  
SKEINING AND ASSEMBLING MACHINE  
Filed April 10, 1923   23 Sheets-Sheet 23

1,598,908

WITNESSES
Oliver W. Holmes
A. L. Kitchin

INVENTOR
C. A. HAMMOND-KNOWLTON
BY Munn & Co
ATTORNEYS

Patented Sept. 7, 1926.

1,598,908

UNITED STATES PATENT OFFICE.

CLARENCE A. HAMMOND-KNOWLTON, OF WATERTOWN, CONNECTICUT, ASSIGNOR TO THE HEMINWAY SILK COMPANY, OF WATERTOWN, CONNECTICUT, A CORPORATION OF CONNECTICUT.

SKEINING AND ASSEMBLING MACHINE.

Application filed April 10, 1923. Serial No. 631,134.

This invention relates to machines for forming skeins and has for an object to provide an improved construction which will form or produce a skein from a thread or yarn and will secure the ends of the thread together.

Another object of the invention is to provide an improved machine for forming skeins which will wind the skein, secure the ends together and then apply a wrapper or label thereto.

A further object is to provide a skeining machine with improved means which will not only form the skein into the proper size and shape but will place a wrapper thereon and then discharge the finished skein in groups of certain predetermined numbers.

In the accompanying drawings—

Figure 14 is a fragmentary enlarged top plan view of the cutting and tying mechanism and certain associated parts.

Figure 15 is a longitudinal vertical sectional view through Figure 14 approximately on line 15—15.

Figure 16 is a sectional view through Figure 17 approximately on line 16—16.

Figure 17 is a vertical sectional view through a wrapper carrier embodying certain features of the invention, the section being taken approximately on line 17—17 of Figure 16.

Figure 18 is an enlarged sectional view through Figure 3 approximately on line 18—18.

Figure 19 is a fragmentary sectional view showing the tilted position of one of the arms illustrated in Figure 18.

Figure 20 is a fragmentary sectional view through Figure 18 approximately on line 20—20.

Figure 21 is a fragmentary sectional view on an enlarged scale through Figure 1, the same being taken approximately on line 21—21.

Figure 22 is a fragmentary sectional view through Figure 1 approximately on line 22—22.

Figure 23 is a fragmentary sectional view on line 23—23 of Figure 14, the same being on a slightly enlarged scale.

Figure 24 is a fragmentary sectional view through Figure 14 on line 24—24, the same being on a somewhat enlarged scale.

Figure 25 is a sectional view through Figure 14 approximately on line 25—25.

Figure 26 is a fragmentary sectional view through Figure 14 approximately on line 26—26.

Figure 27 is a fragmentary top plan view of the structure shown in Figure 28, certain parts being broken away for better illustrating the cutting mechanism.

Figure 28 is a sectional view through Figure 27, approximately on line 28—28.

Figure 29 is an end view of the structure shown in Figure 27.

Figure 30 is a sectional view through Figure 29 approximately on line 30—30.

Figure 31 is a fragmentary sectional view through Figure 30 approximately on line 31—31.

Figure 32 is an enlarged fragmentary sectional view through Figure 6 approximately on line 32—32.

Figure 32ª is a fragmentary sectional view through Figure 33 on line 32ª—32ª.

Figure 32ᵇ is a view similar to Figure 32ª but showing the parts before they were moved to an operative position.

Figure 33 is a transverse sectional view through Figure 32 approximately on line 33—33.

Figure 34 is a fragmentary end view of the thread holding means associated with the winding reel in gripping position.

Figure 35 is a view similar to Figure 34 but showing the parts in a different position.

Figure 7:
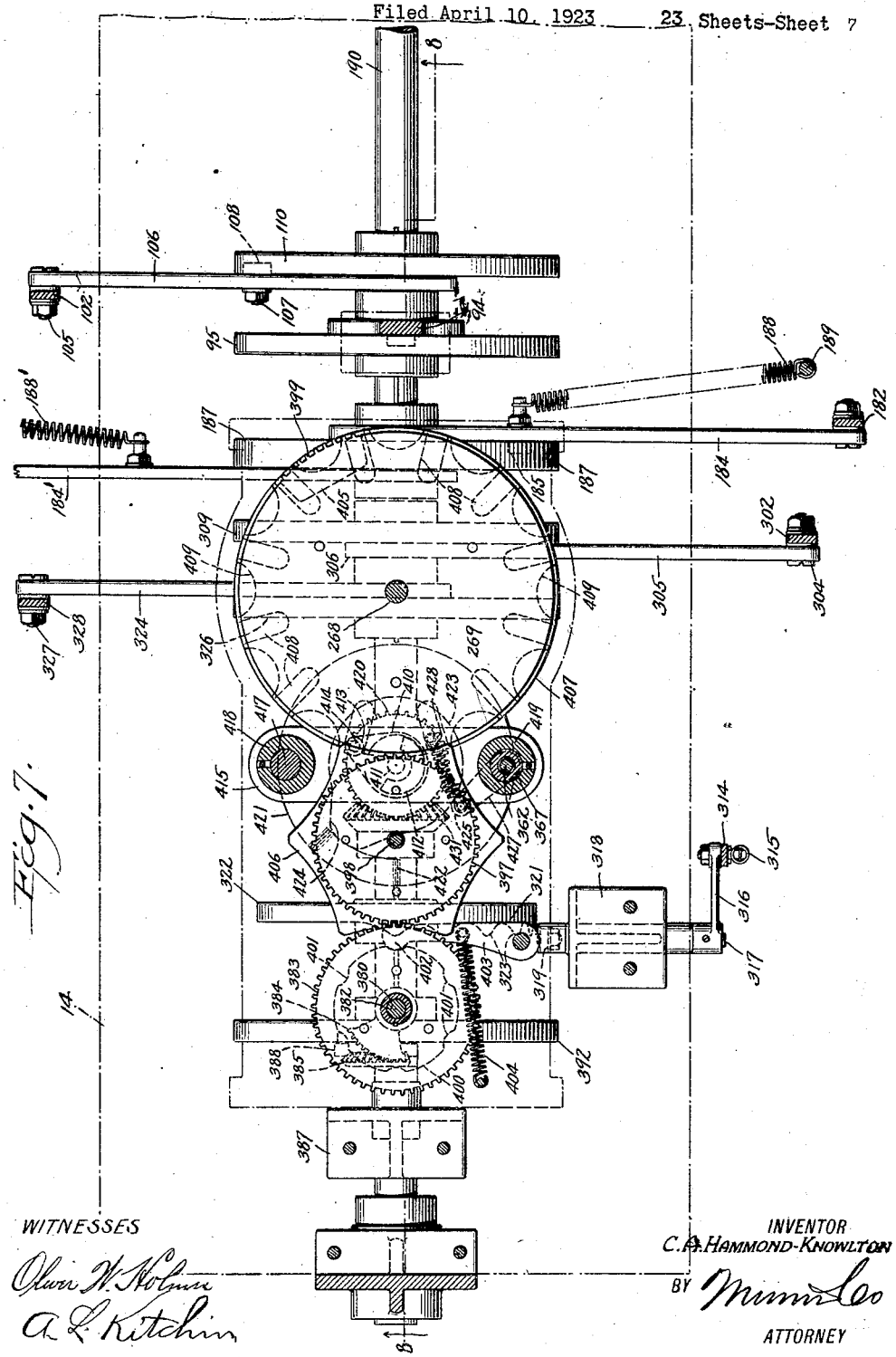
Figure 7 is a longitudinal horizontal section through Figure 8 approximately on line 7—7, the frame being shown partly in dotted lines.
Figure 8:
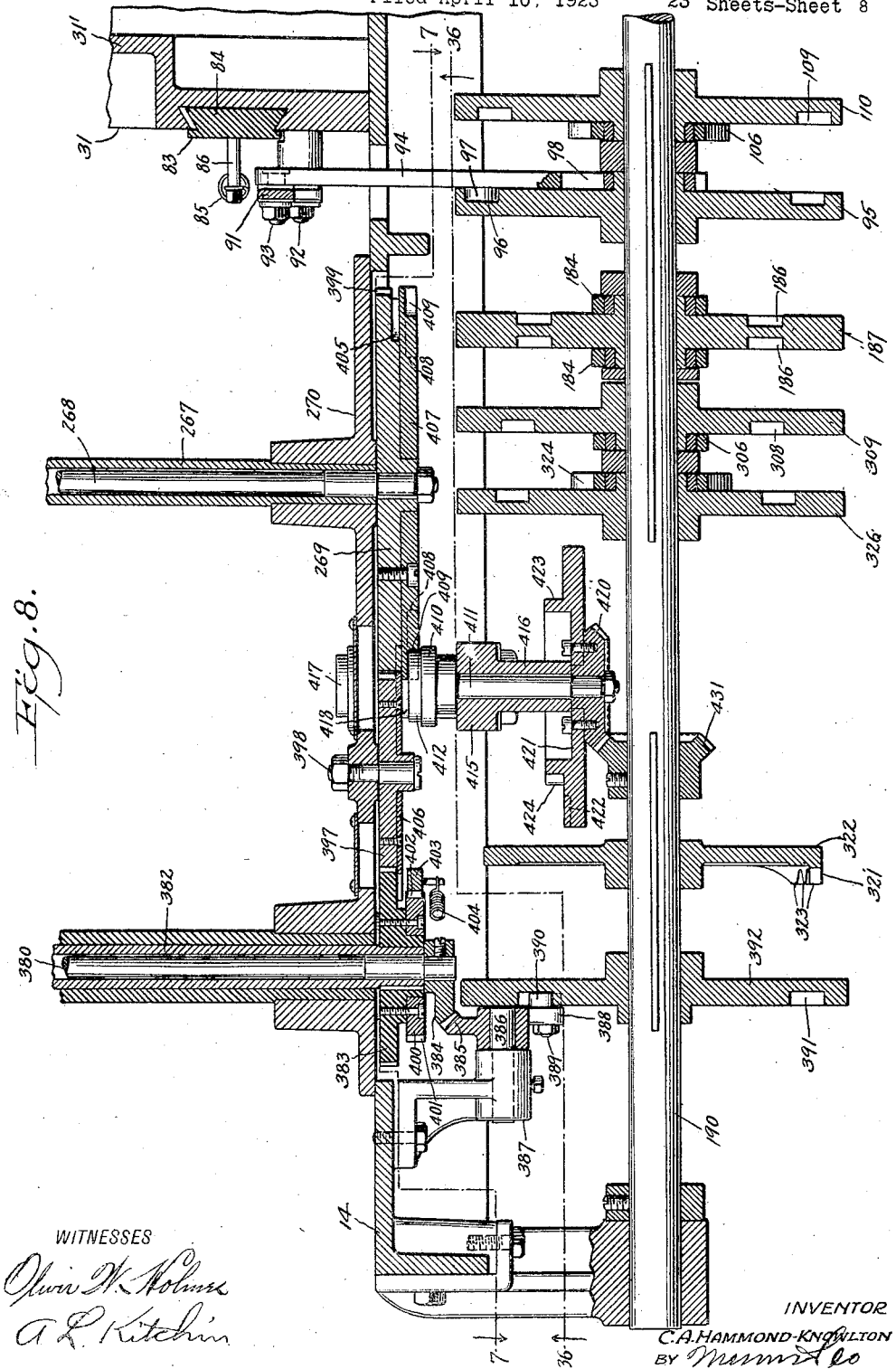
Figure 8 is a longitudinal vertical sectional view through Figure 7 approximately on line 8—8.

Figure 36 is a bottom plan view of the construction shown in Figure 7, along line 36—36 of Figure 8.

Figure 37 is an enlarged detail perspective view of that part of the thread holding mechanism and associated parts connected with the reel.

Figure 9:
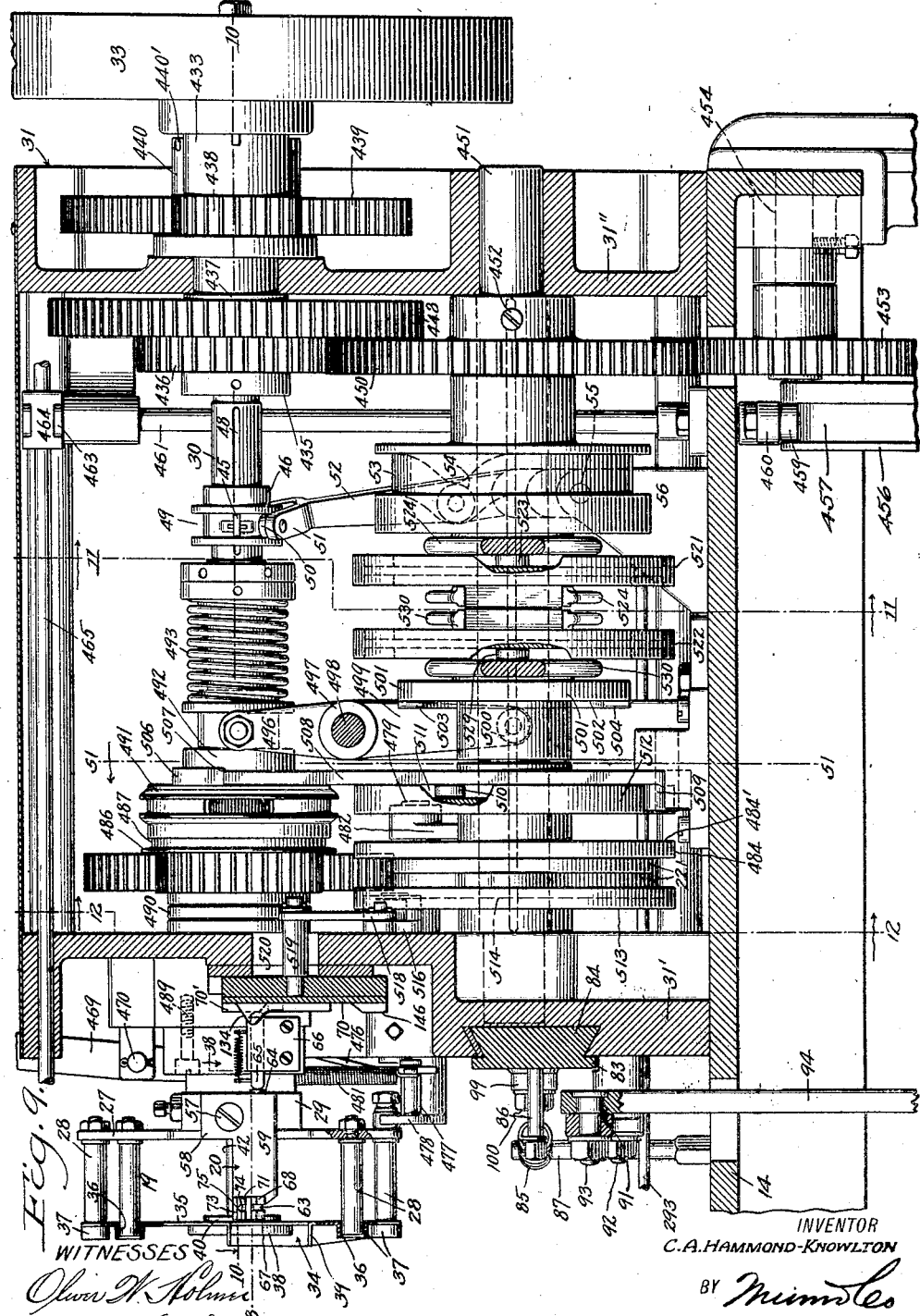
Figure 9 is a sectional view through Figure 4 approximately on line 9—9, the same being shown on an enlarged scale.

Figure 38 is a fragmentary sectional view through Figure 9 approximately on line 38—38.

Figure 39 is a plan view of the skein as it appears when completely wound and located on the reel after the tying members have been applied.

Figure 40 is a front view of the structure shown in Figure 39.

Figure 41 is a detail fragmentary perspective view showing part of the operating members for shifting the thread holding and cutting means.

Figure 42 is a perspective view of the thread holding and cutting means illustrated in Figure 27.

Figure 43 is a diagram illustrating the path of movement of the thread holding and cutting means embodying certain features of the invention.

Figure 44 is a perspective view of a supporting block embodying certain features of the invention.

Figure 45 is a fragmentary perspective view showing the casing and associated parts of the wire cutting and tying mechanism.

Figure 46 is an enlarged perspective view of a block arranged at the inner end of the tying mechanism illustrating a certain guideway and associated parts.

Figure 47 is a perspective view of a bracket or fitting embodying certain features of the invention.

Figure 48 is a fragmentary sectional view through Figure 14 approximately on line 48—48.

Figure 49 is an elevation of a cam disclosing certain features of the invention.

Figure 50 is an elevation of a cam embodying certain features of the invention.

Figure 51 is an elevation of a cam embodying certain features of the invention and showing means for causing the movement of a lever on each half revolution of the cam on line 51—51 of Figure 9.

Figure 5:
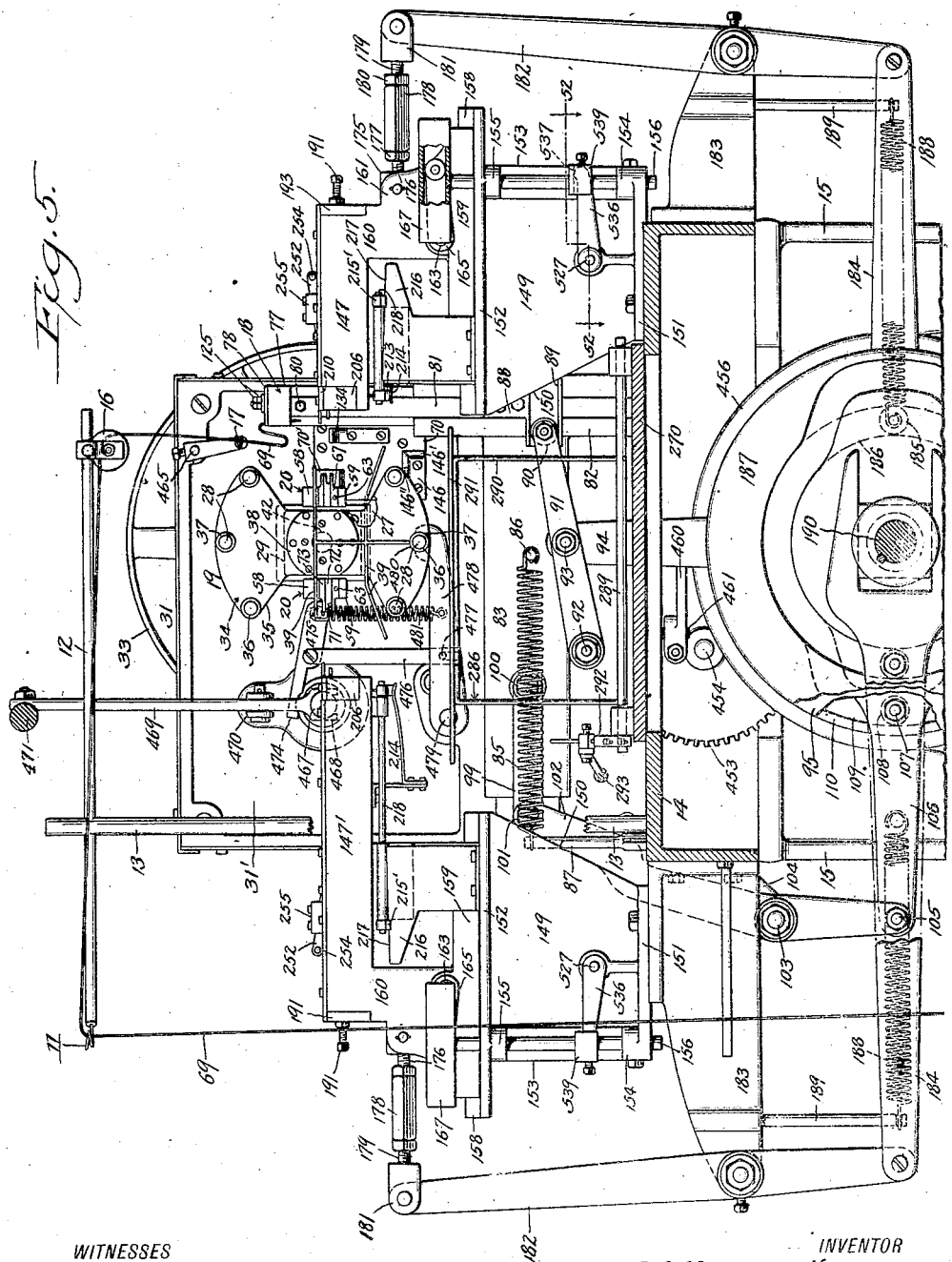
Figure 5 is a transverse sectional view through Figure 4 approximately on line 5—5.

Figure 52 is a fragmentary sectional view through Figure 5 on line 52—52.

Figure 53:
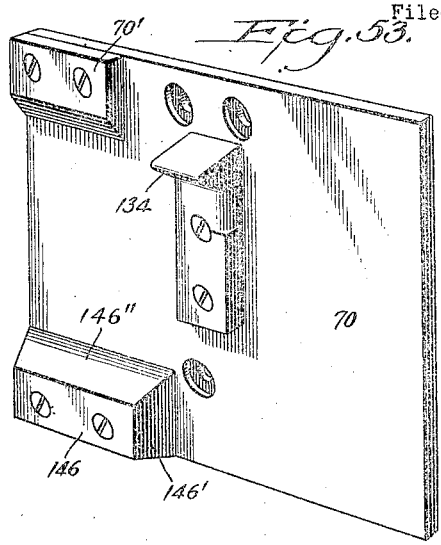

Figure 53 is an enlarged perspective view of a plurality of cams and a supporting plate therefor embodying certain features of the invention.

Figure 54:
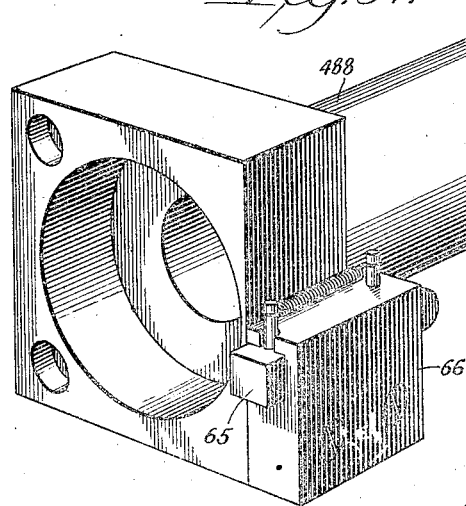

Figure 54 is an enlarged fragmentary perspective view of the supporting head for the reel.

Figure 55:
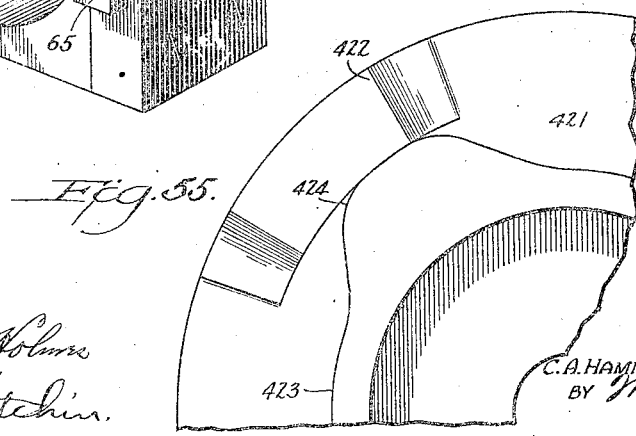

Figure 55 is a fragmentary elevation of a cam forming part of a wiping mechanism embodying certain features of the invention.

Figure 56:
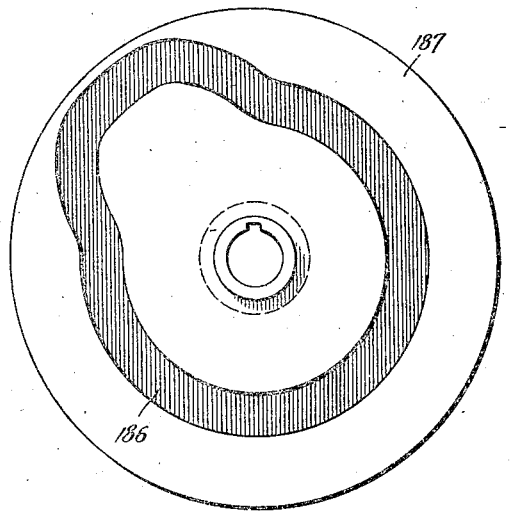

Figure 56 is a side elevation of a cam embodying certain features of the invention and is used in connection with certain tying mechanism.

Figure 57:
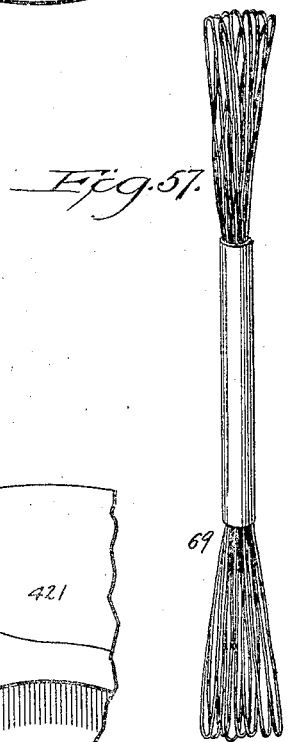

Figure 57 is a side view of a finished skein as it is ready for the market.

Figure 58 is a face view of a cam embodying certain features of the invention and forming part of the mechanism for bending the tying wire.

Figure 59 is a fragmentary side view illustrating one end of the reel locking lever.

In constructing the skeining machine embodying the invention, the parts have been so associated together as to co-operate in a proper sequence to either act simultaneously or at different times in order to measure a given quantity of yarn or thread, cut the same, form the same into a skein, place a wrapper thereon and then discharge the finished skein.

In producing a machine to accomplish this result, a quantity of thread or yarn, as for instance, a ball of silk thread is placed on the floor or any other desired support and is threaded through the guiding eye 11 which is merely a piece of wire turned to form a loop, said piece of wire being supported by a bar 12 carried by the standard or upright 13, which is rigidly secured to the base 14 in any desired manner, said base being supported by any desired number of legs 15 secured to the base in any suitable manner, as for instance, by bolts or screws. The thread extends from the eye 11 transversely across the machine as indicated in Figure 5 to the tension device 16 and from thence through eye 17 to the holding and cutting mechanism 18 hereinafter fully described. Associated with this holding and cutting mechanism is a drum or reel 19 carrying an auxiliary or second gripping device 20. During the operation of the machine, the mechanism 18 moves the thread over to the gripping device 20 where it is grasped and then the mechanism 18 releases the thread and moves back to substantially the position shown in Figure 5. The drum or reel 19 will then rotate the desired number of times to secure the desired quantity of thread. When the desired number of revolutions have been made, the reel 19 will automatically stop and the device 18 will move over and grip the thread above the auxiliary gripping device 20 and then sever the thread beneath the device 18 after which the device 18 will move back out of the way and ejecting mechanism hereinafter fully described will push the reeled thread from the reel 19. As it drops off of the reel 19, it will fall by gravity on one of the hooks 21 forming part of the wrapping mechanism hereinafter fully described.

Before the skein is ejected or pushed off of the reel 19, a tying mechanism hereinafter fully described will move over and secure the two ends of the reeled thread together and also include in the securing operation half of the strands on the reel. This tied skein is then ejected or forced off of the reel 19 and is caught by one of the hooks 21 on the wrapper applying mechanism. This wrapper applying mechanism includes a wrapper ejecting structure 22, a skein carrier structure 23 and a wrapper pulling structure 24. On each of the hooks 21 is mounted a tube 25 and each of these tubes receive from the wrapper ejecting mechanism 22 a wrapper in the form of a tube which is telescoped over the respective tubes 25. As the wrapper is already on the tube 25 when the skein is forced from the reel thereon it is in position to be pulled by the mechanism 24 off of the tube 25 and onto the skein when it reaches the mechanism 24. While the paper tube or wrapper is being thus pulled onto the skein, the hook 21 will hold the skein in place, said hook being assisted by the tube 25 as hereinafter fully described. After the wrapper has been pulled onto the skein as just described, the operation of forming the skein and applying the wrapper has been completed and the complete skein is then moved around to a position diametrically opposite the reel 19 where it is forced off the hook onto one of the receiving arms 26. Each of these receiving arms is intended to receive a given number of finished skeins, the particular showing in the accompanying drawings illustrating a structure wherein each arm 26 will receive twelve skeins, though it will be understood that the device might be arranged to cause the arms 26 to receive more or less as desired. After the various receiving arms 26 leave the vicinity of the structure 23, an attendant may readily remove the finished skeins and dispose of them as desired.

It will thus be seen that the thread is fed in from one part of the machine and wrappers from another part, said wrappers being in the form of tubes. The parts are so proportioned and are caused to operate in such timed relationship as to cause certain lengths of thread to be wound into a skein and then move over so as to receive the wrappers at the proper time.

In order to understand the detail construction for accomplishing the results just set forth in the manner described, the various parts of the machine will be independently described and then their various connections set forth.

*Winding drum and skein ejector.*

The winding reel 19 is constructed with a base plate 27 on which are mounted a number of pins 28, which pins are arranged to travel in a circle as illustrated in Figure 5 when plate 27 is rotated. These pins are shown with reduced threaded ends co-acting with nuts whereby they are clamped rigidly in place but it is evident that other forms of pins or if desired, other forms of winding surface might be used without departing from the spirit of the invention. The base plate 27 is mounted on a tubular block 29 and is held rigidly thereto by any suitable means, as for instance, clamping screws. This block is keyed or otherwise rigidly secured to the hollow shaft 30, which shaft is journaled in suitable openings in the frame 31 which may be of cast metal or any other desired material and which is bolted or otherwise rigidly secured to the base 14. This frame is provided with various openings and bearings for supporting different shafts as hereinafter fully described. The shaft 30 extends from the block 29 through the wall 31' to near the opposite wall 31" and is connected by a suitable gearing hereinafter fully described with a stub shaft 32 which carries a driving pully 33. On the various pins 28 the thread is wound and when a sufficiently quantity has been provided, it is cut and pushed off by an ejector 34. The ejector 34 is provided with a bottom plate 35 having a plurality of apertures 36, said plate having upstanding flanges 37 at each aperture 36 so as to provide a guiding tube surrounding each pin 28. The plate 35 has riveted or otherwise rigidly secured thereto a plate 38, which plate is secured to shaft 42. The plate 35 is provided with a number of upstanding fins 39 designed to press against the thread of the skein as it is forced from the pins 28 and remove or neutralize any static electricity produced in the thread during the winding operation. The plate 38 is secured by screws or otherwise to an internally threaded thimble 40 which is screwed onto the threaded end 41 of the ejecting shaft 42. The shaft 42 is preferably reduced in diameter from the line 43 to the opposite end in order to reduce the friction to a minimum. This shaft is carried by the tubular shaft 30 and rotates therewith but slides longitudinally thereof independently. The shaft 42 is provided with an aperture 44 near the end opposite the thimble 40, said aperture accommodating a bar 45, said bar preferably being flat and rather snugly fitting the aperture 44. The bar 45 extends upwardly into a sleeve 46 loosely mounted on the hollow shaft 30, said bar extending through suitable slots 47 and 48 in shaft 30. The sleeve 46 is provided with an annular groove 49 receiving the rollers 50 mounted on the bifurcated end 51 of the lever 52. The ends of the bar 45 are rigidly secured in the sleeve 46 by suitable pins or in any other desired manner. The lever 52 is operated by the action of a cam wheel 53 co-acting with the roller 54 and a pivotal support 55 carried by a suitable bracket 56 secured to the base 14. When the cam wheel 53 rotates as hereinafter fully described, it will swing the lever 52 back and forth once and, consequently, cause the ejector plate 35 and associated parts to move from a position against the base plate 27 to the position shown for instance, in Figures 9 and 10 and then move back against the base plate. Immediately after the thread has been wound on the reel, consisting of the pins 28 and associated parts, tying mechanism hereinafter fully described will operate for tying the loose ends together and also tying the loose ends to a number of the other strands.

After the tying operation has been completed, the ejector will immediately operate for pushing the tied threads now forming a skein, off of the reel and by reason of the position of the hooks 21, cause the same to drop by gravity on these hooks to be operated on later in such a manner that a wrapper will be applied thereto and the finished skein moved to a discharging or receiving structure.

*Tying and cutting mechanism.*

The thread as heretofore described, is led in through the eyes 11 and 17 and then wound on the reel 19. In order that the ends of the threads may be properly taken care of and the winding mechanism caused to properly function, a plurality of co-acting mechanisms have been provided for firmly gripping the thread, moving it to a second gripping structure and cutting it after the first gripping structure has taken hold at a different point. The various devices for accomplishing the desired result of cutting and tying the skein will now be described in the order in which they are used.

Figure 10:
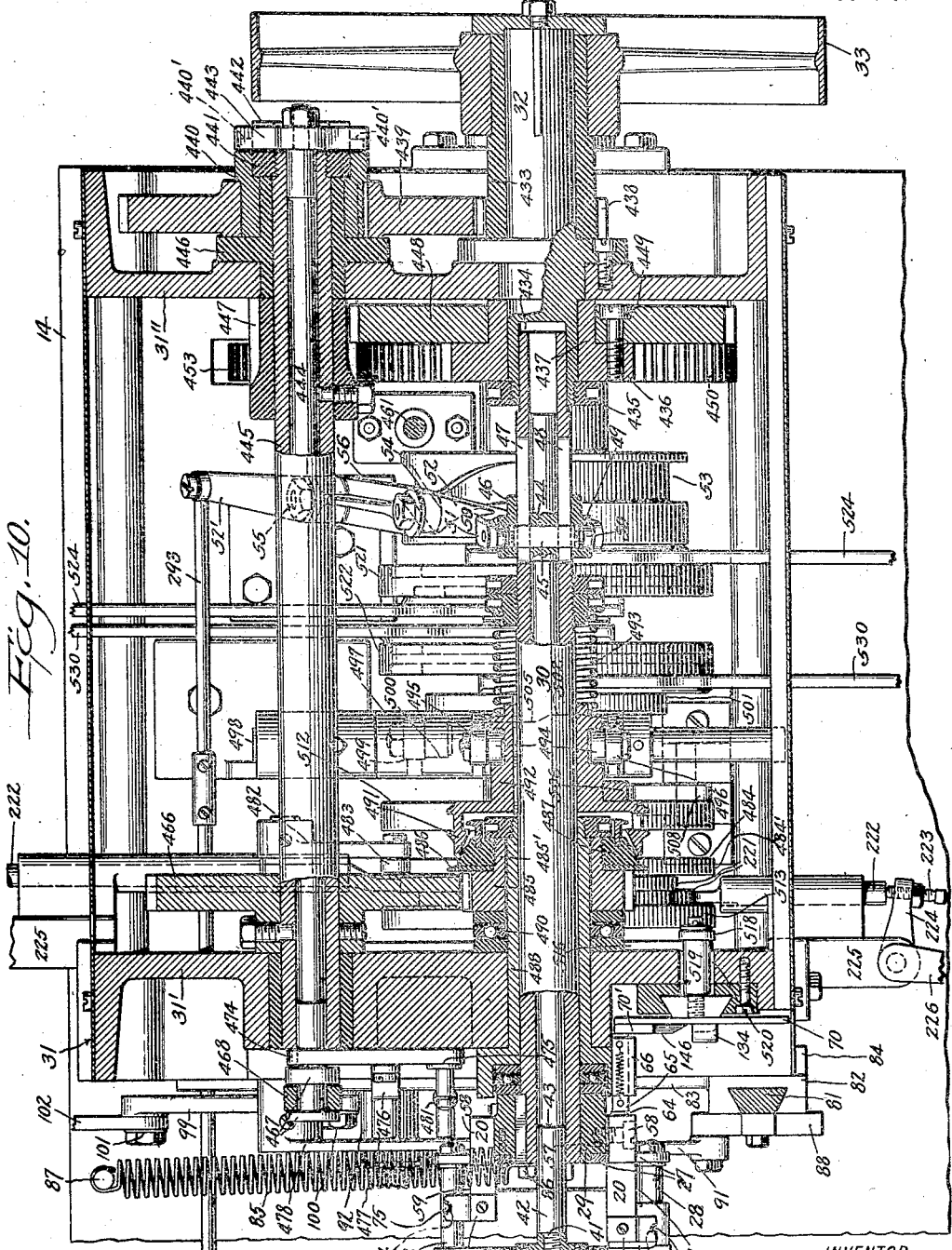
Figure 10 is a longitudinal horizontal sectional view through Figure 9 approximately on line 10—10.

From Figures 5, 9 and 10 it will be seen that the gripping or holding devices 20 are carried by the reel structure 19 so as to rotate therewith. This holding device is rigidly secured to the tubular block 29 (Figure 10) in any suitable manner, as for instance, by the screw 57 projecting preferably through the enlargement 58 (Figure 37). The enlargement 58 is part of a solid block of metal 59 which is provided with a large bore 60 and a small bore 61, the large bore accommodating spring 62 while the small bore accommodates the rod or shaft 63, which shaft extends also through the large bore and through a block 64 positioned in the enlarged end 58. The block 64 coacts with the sliding bar 65 carried by the bracket 66 and said sliding bar in turn coacts with cam 70' carried by the sliding cam plate 70. The spring 62 acts against the block 64 and against the shoulder formed at the end of the bore 60 to force the shaft 63 in such a direction that the jaws 67 will move toward the stationary jaw 68 forming part of the block 59. It will be noted that the block 64 is rigidly secured in any desired manner to the shaft 63 so as to freely reciprocate. This arrangement for moving the jaw 67 permits the insertion of the thread 69 either manually or automatically as hereinafter fully described. After the insertion of the yarn or thread 69, the block 64 moves off of the co-acting cam 70' on the cam plate 70 hereinafter more fully described. Above the jaws 67 and 68 is arranged a section 72 formed with a projection 71 preferably formed integral with the block 59, said projection overlying the jaws 67 and 68 and substantially conforming to their shape when they are closed. Associated with projection 71 is an upper section 73 which is rigidly secured thereto. The section 72 is provided with a rather deep notch 74, said notch preferably being rounded at the inner end and merging into a restricted notch 75 of substantially the same shape but smaller. These notches help to guide the yarn or thread 69 into position to be properly grasped by the jaws 67 and 68 and also guide certain strands of the yarn into proper position to receive the tying member hereinafter fully described. In fact, the notch 74 forms a tying mold in a certain sense for receiving the ends of the U-shaped wire which when forced into the notch 74 follows the walls of the notch so that the ends will overlap and, consequently, will wrap around whatever yarn or thread that may be at that time positioned in the notch 74.

After the thread or yarn has been placed into position and gripped by the jaws 67 and 68 as just described, the reel 19 will rotate any desired number of times according to the way the parts of the machine are set, the detail construction shown in the accompanying drawings illustrating mechanism for causing the reel to rotate eight times. While the reel is rotating, the guiding eye 17 will move back and forth longitudinally of the reel so that the thread wound on the reel will cross at one point but otherwise arrange itself into two sets of groups as indicated for instance, in Figures 39 and 40. Mechanism hereinafter fully described will force one of the sections 76 of the skein into the notches 74 and 75 where a tying mechanism, as for instance, a tying wire will be forced into position and around this section of the skein.

After the tying operation has been completed, both sections of the windings are pushed off of the reel by the ejecting mechanism heretofore described. Co-acting with the gripping or holding device 20 just described, is the holding and cutting mechanism 18 which also acts as means for gripping the thread or yarn before it has been cut and then cutting it to disconnect it from the skein on reel 19. This mechanism 18 grips the loose end of the thread before it has been cut and after it has been cut moves back to a position out of the way while the section 76 of the skein is being tied and while the skein is being ejected. After this has been done, the mechanism 18 moves again into operative position in respect to the holding device 20 for positioning the end of the thread or yarn 69 so that it may be again gripped by the jaws 67 and 68 as indicated in Figures 34 and 38. The holding and cutting mechanism 18 is formed with a housing or casing 77 (Figures 27 and 28) which casing is provided with a covering plate 78. The casing 77 is provided with a depending lug 79 designed to receive the machine screw 80 whereby said lug is rigidly clamped to the support 81 (Figure 41). This support is known as a dove-tail and reciprocates in the head 82, which has a dove-tail slot therein, said head being formed preferably integral with the plate 83, which plate is provided with a dove-tail section 84 (Figure 9) fitting into a suitable dove-tail groove provided in the wall 31'; this groove extending transversely of the machine whereby the plate 83 may freely reciprocate in a transverse direction. A spring 85 is connected at one end to a suitable post 86 mounted on plate 83 and at the opposite end to a suitable post 87 mounted on the base 14. This arrangement permits the spring 85 to give the plate 83 and associated parts a tendency at all times to move toward the post 87. It will thus be seen that this action of the spring will cause the support 81 and the holding and cutting mechanism 18 to move horizontally toward the reel 19.

Means as hereinafter fully described are provided for causing the holding and cutting mechanism 18 to move away from the reel and also upwardly and downwardly. The upward and downward movement is brought about by the provision of a fitting 88 riveted or otherwise rigidly secured to the support 81, said fitting having a groove 89 extending transversely of the machine and substantially parallel with the plate 83. This groove accommodates a pin or roller 90 carried by one end of the lever 91, which lever is pivotally mounted at 92 to the wall 31'. A pivotal connection is provided at 93 so as to connect the lever with a thrust arm 94, which thrust arm is moved upwardly and downwardly by the cam wheel 95 (Figure 8) which wheel is formed with a cam groove 96 accommodating the pin or stud 97 extending from the arm 94. The arm 94 straddles the hub of the cam wheel 95 and in fact, is provided with a slot 98 which fits over the hub of the cam wheel so that it may be guided in an up and down movement but permits the arm 94 to have a slight swinging movement to accommodate the action of the lever 91. This construction is properly timed to cause the holding and cutting mechanism 18 to move upwardly and downwardly at the proper time to co-act with the other parts heretofore described and also with certain other parts hereinafter described. The plate 83 is moved against the action of spring 85 by reason of the construction particularly illustrated in Figure 5, which includes a link 99 pivotally mounted at 100 to the plate 83 and pivotally mounted at 101 to the lever 102, which lever is pivotally mounted at 103 onto the bracket 104 rigidly secured to the base 14 in any desired manner. The lower end of the lever 102 is pivotally connected at 105 with a thrust arm 106, which thrust arm is provided with a stub shaft 107 secured in any desired manner thereto and carrying a roller 108 fitting in the cam groove 109 of the cam wheel 110. The end of the arm 106 carrying the stub shaft 107 is preferably bifurcated and straddles the hub of the cam 110 whereby it is properly guided in its movement. The cam wheel 110 is properly timed to force the plate 83 and associated parts to the right as shown in Figure 5 against the action of spring 85.

By the construction of the various mechanisms just described, the holding and cutting mechanism is moved back and forth transversely of the machine and is also moved upwardly and downwardly, some of these motions taking place substantially at the same time to cause the mechanism 18 to move properly and function properly.

The detail construction of the holding and cutting mechanism 18 is shown particularly in Figures 27, 28, 30, 31 and 42. From these figures it will be noted that the cutting mechanism includes a pair of cutting blades 111 and 112, these blades having shanks 113 and 114 respectively extending substantially at right angles to the cutting edges of the blades. There is provided a slot 115 in each of these shanks, said slots being arranged at different angles as illustrated in Figure 27 so that the pin 116 extending therethrough may act to shift the position of the shanks 113 and 114 and, consequently, to open and close the cutting blades as the actuating bar 117 reciprocates, pin 116 extending through one end of this bar. The casing 77 is divided into longitudinal compartments 118 and 119 in which the respective bars 117 and 120 reciprocate, said compartments merging into a large compartment 121 at the end in which the blades 111 and 112 and associated parts are mounted. It will be noted that the blade 111 is provided with an upstanding tubular sleeve 122 which is surrounded by part of the blade 112 and the upstanding tubular sleeve 123 forming part of the blade 112. A pintle or centering pin 124 extends through the sleeve 122, said pin extending through the plate 78 and being threaded at the upper end for receiving suitable clamping nuts 125. This arrangement holds the blades in proper place as the pin 116 and bar 117 reciprocate for opening and closing the blades. The bar 117 is provided with a vertical notch or groove 126 near the end opposite the pin 116, said groove accommodating the end 127 of a lever 128 pivotally mounted at 129 to part of the lug 79. The lever 128 near its lower end is much wider than the end 127 and is provided with a socket 130 for receiving one end of the spring 131, the opposite end of said spring being arranged in a suitable socket 132 in the lug 79. The lower or widened end of the lever 128 is also provided with a projecting cam 133 co-acting with the cam 134 rigidly secured to the cam plate 70. When this cam plate moves downwardly until the cam 134 engages the cam 133, said cam 134 will move the lever 128 for shifting the bar 117 longitudinally in such a direction as to close the blades 111 and 112 and, consequently, cut the yarn or thread 69.

As soon as the cam 134 moves out of the way of cam 133, lever 128 and associated parts will be quickly moved back to their former position by spring 131. The spring 131 acts to normally hold the cutting edges of the blades 111 and 112 separated as shown in Figure 27 and these cutting edges are forced together or rather caused to slidingly pass each other in a shearing action against the action of spring 131 when the cams 133 and 134 co-act for moving the lever 128.

Arranged in the housing or casing 77 and above the blades 111 and 112 (Figure 31), is a thread gripping or clamping structure which includes in its construction the sliding bar 120 having a projection 135 presenting a shoulder or clamping edge 136 co-acting with the shoulder or clamping edge 137 which is one edge of a combined filling and clamping block 137′ held in place by a suitable rivet or pin 137″ of the casing 77. The bar 120 near the end opposite the extension 135 is provided with a vertical groove 138 adapted to receive the end 139 of lever 140. This lever is pivotally mounted at 141 on the extension 79 of the casing 77 and is resiliently held in a given position by the spring 142, said spring having its ends positioned in the sockets 143 on the projection 79 and socket 144 in the lever 140. A cam 145 extends from the lower end of the lever 140 and co-acts with the cam 146 carried by the cam plate 70 whereby when said cam plate is moved upwardly the proper distance, lever 140 will be swung against the action of spring 142 for moving the clamping or gripping extension 135 away from the surface or shoulder 137. When the cam 146 is moved away from the cam 145, the spring 142 will move the parts so that the shoulder 136 will clamp a thread, yarn or other article arranged between the same and shoulder 137. It will thus be seen that the clamping or gripping structure continually grips by reason of the spring 142 until positively moved by the cams just described to an open position.

When first starting the machine, the end of the thread or yarn may be inserted into the holding or gripping structure 18 manually and then the machine is started whereupon the gripping structure 18 will move downwardly in a vertical line and then horizontally over to a position near the reel and below the gripping structure 20 as shown in Figure 34. As indicated in Figure 43, the gripping structure 18 starts from position A, which is the first position, moves downwardly and over to position B where it remains stationary until the gripping structure 20 has gripped the end of the thread and thread has been released from the structure 18. The reel 19 is stationary while this is taking place but as soon as the gripping structure 18 has moved back toward point C a sufficient distance to be out of the way, the reel begins to rotate as heretofore described and will continue to rotate until the desired quantity of thread has been wound thereon. While the reel is rotating, the gripping structure 18 will not only move back to point C but vertically upwardly to point D where it remains stationary and while in this position is empty. As soon as the reel has stopped rotating, the gripping structure 18 will move horizontally over to the position E (Figure 43) and will first grip the thread and then sever the thread below the point gripped so that the thread wound on the reel will be disconnected or separated from its supply. Immediately before the thread is severed or cut at point E, the tying mechanism will function as heretofore set forth. As soon as the thread has been cut at point E, the gripping structure 18 will move vertically upwardly a short distance and then horizontally over to position A as shown in Figure 43 which is the normal or starting point. By this operation it will be noted that after the desired number of turns have been wound on the reel, mechanism 18 moves to the proper position, cuts the thread and at the same time grips the thread above the severing point and then moves out of the way still holding or gripping the thread near the severed end. After the thread has been inserted into the holding or gripping structure 18 at the starting point A (Figure 43) or as shown in Figure 5, the machine is started and the gripping structure 18 will move directly downwardly for its full travel to point C (Figure 43) and then over to point B. It will be noted particularly from Figures 5 and 14 that the cam plate 70 has previously moved down to the position shown in Figure 5 before the gripping structure 18 moves from the starting point A so that the gripping structure 20 is open. As the gripping structure is open when the gripping structure 18 has reached the position B (Figure 43), it will have automatically inserted the thread into the gripping structure 20. When the parts are in this position as illustrated in Figure 34, they will remain stationary and the cam plate 70 will move upwardly so that the cam 70′ will move away from the rod 65 (Figure 14) and the gripping structure 20 will, therefore, automatically close and thereby grip the thread. Immediately after this occurs, the cam 146, by reason of the continued movement of the plate 70 will engage the lever 140 (Figure 30) and move the same against the action of spring 142 whereupon the thread will be released from the gripping structure 18. As soon as this release has been affected, the gripping structure 18 will move back to point C and from thence up to point D where it remains stationary while the reel is winding the desired quantity of thread thereon. While the gripping structure 18 is moving to point D and the reel is winding the thread thereon, cam plate 70 continues to move upwardly until the cam 146 is substantially opposite the cutting structure 20. As soon as the reel has stopped its rotation, the gripping structure 18 will move from the position D (Figure 43) over to position E which is near the gripping structure 20 but slightly above the same as illustrated in Figure 35. As the gripping structure 18 moves over to this position, namely, position E, the beveled face 145′ will strike against the beveled end 146″ of cam 146 and will open the gripping structure 18 so that it will admit the thread extending from the eye 17, to the gripping structure 20. As soon as the gripping structure 18 has moved over to the position E and the gripping structure has straddled the thread as shown in Figure 35, the cam plate 70 will move downwardly and during the first part of the movement the lever 140 will slip off of the cam 146 over the cam surface 146″ whereupon the gripping structure 18 will immediately grip the thread. The cam plate 70 after this operation, will continue to move downwardly and the cam 134 will function as it moves downwardly to swing the lever 128 (Figure 28) inwardly against the action of spring 131 for actuating the cutting members 111 and 112 (Figure 27). Immediately after this cutting operation has been performed and as the plate 70 continues to travel, cam 70′ will move down to the position shown in Figure 14 and open the gripping structure 20 so that the ejector may readily eject or push the finished skein from the reel.

During the functioning of the tying structure 147, a short section of the wire leading from the spool 148 is cut off, bent into a U-shaped structure and then forced into the notch 74 until the ends slide past each other and bend around the strands of thread in notch 74 whereby said strands are tied together. It will be noted that both ends of the thread are located near the aperture 74 so that the tying member ties these two ends in juxtaposition and to certain of the other strands of the skein so that the tied structure will appear as shown in Figure 39.

In the tying structure 147, the supporting block 149 (Fig. 44) may be termed part thereof as it acts as a support and guide for certain members. This block is provided with a central supporting web 150 extending into laterally extending base flanges 151, a pair of top flanges 152 and an end section 153. The base flanges and the top flanges 151 and 152 respectively are provided with thickened portions 154 and 155 respectively, said flanges and thickened portions having apertures for receiving the respective rods 156 and 157. The top flanges 152 are provided with a dove-tail bead 158 designed to receive the sliding base 159 (Figure 45) of a tying casing 160. The casing 160 is provided with extending side flanges 161 and 162 which carry shafts 163 and 164 to which arms 165 and 166 are rigidly secured, each of said arms carrying a roller at the end fitting into the channel iron guides 167 and 168 carried by the respective rods 156 and 157. It will, therefore, be seen that whenever these rods are raised and lowered, arms 165 and 166 will be swung and the shafts 163 and 164 rocked for swinging the push levers 169 and 170 rigidly secured to the shafts 163 and 164. The push levers 169 and 170 push or move longitudinally the respective bars 171 and 172 against the action of the respective springs 173 and 174 for certain purposes as hereinafter fully described. Arranged between the flanges 161 and 162 is a block 175 having journal extensions mounted in these flanges so that the block may not rotate, said block having a threaded aperture for receiving the threaded bar 176, which bar is threaded through the lock nut 177 and into the threaded tube 178, which tube is preferably hexagonal for more easily rotating when it is desired to adjust the various parts. A second thread rod 179 is screwed through the lock nut 180 and into the internally threaded tube 178, said second threaded rod 179 being provided with a yoke 181 straddling the end of the lever 182 to which it is connected by a suitable pin. The lever 182 is pivotally mounted on a bracket 183 and the lower end is pivotally connected with the push or thrust arm 184. This thrust arm is provided with a stub shaft carrying a roller 185 fitting into the cam groove 186 in the cam wheel 187. A spring 188 is connected at one end with a stationary post 189 secured to bracket 183 while the opposite end of the spring is connected to the stub shaft carrying the roller 185 or in some other convenient manner to the arm 184, whereby the roller 185 is continually pressed against the outer wall of the cam groove 186. This will cause an accurate movement of the parts and prevent any loose motion being transmitted to the tying mechanism 147. The inner end of the thrust arm 184 is preferably bifurcated for straddling the hub of the cam wheel 187 (Figure 56) or for straddling the square block fitted thereon. By reason of the construction just described, the casing 160 and associated parts is reciprocated by power taken from the shaft 190 extending longitudinally of the machine beneath the base plate 14.

On the opposite side of the machine to arm 184 and associated parts is arranged a similar structure 184' with its spring 188' connected to the post 189' and to the arm 184' so as to act in a similar manner to the arm 184 but on the opposite side and naturally in the opposite direction. As this structure and also the various structures associated therewith are identical with those on the opposite side of the machine, it is believed no further description is necessary.

Referring again to the bars 171 and 172, it will be noted that their rearward movement or movement toward the levers 169 and 170 is limited by the adjusting screws 191 and 192, said adjusting screws being carried by a plate 193 connected in any manner to the casing 160. These bars are provided with bores at the ends opposite the set screws 191 and 192, said bores accommodating the springs 173 and 174 and also the pins 194 and 195 which act in a certain sense as extensions of the springs so that as they bear against the end wall 196 of the casing 160 the springs will continue to act to hold the blocks either against the levers 169 and 170 or the adjusting screws 191 and 192. One of the side walls of the casing 160 is cut away for instance at 197 to accommodate a number of parts extending therethrough. The bar 171 is provided with a substantially L-shaped plate 198 secured to the bar 171 by a screw 199 and by suitable pins 200. The bar 172 is provided with a plate 201 held in place by a suitable screw and extends into the cut away portion 197 where it is secured by suitable rivets, pins or other means to a sliding bar 202 while the plate 198 is riveted or otherwise rigidly secured to the sliding bars 203 and 204, said latter bars being arranged on opposite sides of bar 202 and snugly fitting against the same for permitting an easy sliding movement. The end of the bar 202 is formed substantially arc-shaped and acts as an ejecting member for the tying wire or other tying means used in tying the ends of the yarn of the skein together.

In operation, a section of wire from the spool 148 is fed by mechanism hereinafter fully described into the path of movement of the bars 203 and 204 when said bars have been retracted by the lever 182. This section of wire is only as long as the distance from the outside edge of bar 204 to the outside edge of bar 203 and consequently, when these two bars move forwardly they will push the short section of wire along and against the pin 205. As this pin remains stationary and the bars 203 and 204 continue to move, the short section of wire will then be bent into a U-shaped structure as indicated in Figure 14. The parts will continue to move until they eventually assume the position shown in Figure 35. After the bars 203 and 204 have moved a certain distance as just described, pin 205 will move out of the way and bar 202 will begin to move so that when the parts are substantially in an interlocked position as shown in Figure 35, bar 202 will force the U-shaped wire into the notch 74 and will continue to move the same until the legs thereof coil around the yarn or thread and are tightly pinched against the same.

The end of the casing 160 is formed by the block 206 as shown in Figure 46. This block is secured by screws or otherwise to the other parts of the casing and by the construction near one end thereof, presents a grooved guide-way 207 for the bars 202, 203 and 204 while the projecting ends 208 and 209 move beneath the section 72 and, consequently, straddle the yarn that is extending through the notch 74 whereby the yarn is held firmly in place while the U-shaped wire tying member is forced in position. Arranged on top of the block 206 is a plate 210 secured thereto by suitable screws, said block covering the guiding channel 207 and presenting a bifurcated or fork structure 211 overlapping the top section 73 of the holding structure 20. The remaining part of the casing 160 is covered by one or more covering plates as desired of any suitable construction. The pin 205 as above mentioned, moves out of the way before the bar 202 reaches the same. The construction for producing this result is shown particularly in Figures 14, 25 and 26. As indicated in Figure 26, the pin 205 extends through a suitable aperture in the block 206 and is supported by a comparatively large rod 212 extending into part of the block 206 and part of the casing 160 arranged below the block. This rod is provided with an enlarged end 213 acted on by spring 214 for normally holding the pin 205 and parts connected therewith elevated. A bifurcated rocker arm 215 is provided and arranged with one end resting on the enlarged end 213 while the opposite end is rigidly secured to a rock shaft 218 carried by a suitable bracket secured to the depending web 219. An auxiliary arm 215' is also rigidly secured to the shaft 218 at a point spaced from the rocker arm 215 as illustrated in Figure 5, said auxiliary arm having its outer end extending into the path of movement of the bracket 216, said bracket being formed with a cam face 217. This bracket and cam face are stationary while the connection of the arms 215 and 215' to the rock shaft 218 permits these arms to rock and, consequently, when the casing 160 is moved toward the reel these rocker arms will be actuated for forcing the pin 205 downwardly and out of the way of the plate or bar 202.

In order to permit the bars 202, 203 and 204 and associated parts to properly function, feeding means have been provided for feeding the wire 220 from the spool 148 forwardly a certain distance each time the tying mechanism operates. This mechanism, particularly shown in Figures 14 and 47, includes a cam wheel 221 operating to move the push rod 222 in one direction, said push rod acting on an adjustable screw 223 threaded into the end of the arm 224, which arm is journaled on a bracket 225 and is also rigidly secured to a second arm 226 by a suitable connecting pin. The arm 226 is connected to a link 227 to one end of a lever 228 which lever is pivotally mounted at 229 on the projection 230 of the supporting bracket 231. The lever 228 is connected rigidly to a shaft 229 positioned in the extension 230 which shaft is also connected rigidly to the bar 232 having a cam face 233 engaging the shoulder 234 depending from the block 235. The extension 230, as well as the extension 236, are integral projections of a bracket 231 bolted or otherwise rigidly secured to the block 149. The cam wheel 221 acting through the various parts just mentioned, holds the block 235 and associated parts substantially as shown in Figure 14 against the action of the spring 237. This spring acts against the block 235 and against the stop 238 adjustably secured to the shaft 240 which is rigidly secured to the bracket 231. The stop 238 is provided with a small aperture through which the wire 220 extends, said stop in this instance acting as a guide for the wire, which wire extends from the stop through a small groove in the plate 241 and is held in this groove by a co-acting plate 242. This wire which is the preferable tying element is very small and in fact is so small that it would be impossible or extremely difficult to provide a reasonably snug fitting drilled passage-way and, consequently, the plate 241 has been provided which is formed with a very small groove sufficiently large to receive the wire but allows substantially no loose motion. This arrangement holds the wire perfectly straight and allows it to be forced forward when the block 235 is moved forward by the spring 237 which takes place whenever the cam wheel 221 permits. As soon as the wire has been fed forward one step by the movement of the block 235 it will be projected across the path of movement of the bars 203 and 204 so that as these bars move forwardly, bar 203 will act as a shearing member and shear off the projected section of wire. While this is being done or about this time, the cam wheel 221 acts to move the block 235 back to the position shown in Figure 14 against the action of the spring 237. As the block 235 moves back the gripping foot 243 slips over the wire and takes a new hold.

This action is caused by reason of the fact that the gripping foot is pivoted at 244 onto the block in a suitable recess formed therein and is provided with an extension 245 pressed by the spring 246. In order that the wire 220 may be held stationary while the block 235 and associated parts move back to the position shown in Figure 14, means have been provided for gripping the wire for holding the same stationary while this action takes place. This means is shown particularly in Figures 14 and 24 and includes in its construction a clamping arm 247 having a clamping foot 248 adapted to press against the wire and pinch the same against the plate 249. The clamping arm 247 is provided with an enlargement 250 having an aperture for receiving the shaft 251 extending from the arm 252 whereby the pin 253 may lock the arm 252 rigidly to the arm 247. The arm 247 may be integral with the stub shaft 251 or may be made separately therefrom and rigidly secured thereto. The arm 252 is provided with a suitable stub shaft carrying a roller or enlargement 254 for engaging the cam 255 carried by the casing 160, said cam being merely a bracket having an overhanging shoulder, said overhanging shoulder being formed with inclined ends 256 and 257 to permit the roller or enlargement 254 to freely move beneath the cam and therefrom. The movement of the arm 252 is very small as it is merely required to lift the arm 247 a very short distance and release or rather relieve the pressure on the wire 220. The arm 247 is provided with a rear extension 258 resting on top of the pin 259, which pin is given a continuous tendency to move upwardly by the spring 260. This structure causes the arm 247 to continually press against the wire 220 until the roller or enlargement 254 moves beneath the cam 255 whereupon the wire is released. At this time of release, block 235, wire 220 and associated parts are moved forwardly under the action of spring 237. It will be evident that this motion is very quick as the spring acts immediately upon being released. After passing the clamping foot 248, the wire extends through an aperture in the block 261, which block is clamped to the bracket 231 by suitable screws, said block being arranged adjacent the plate 262 which carries the shaft 251.

Arranged beneath the block 261 is a plate 249 held in place by the same screws. Preferably, there is provided a groove in plate 249 for accommodating the wire 220 and plate 261 (which also may be grooved) holds the wire in the groove. The plate 249 is also provided with a member 264 which merges into an upstanding flange 265 (Figures 47 and 48), said flange being formed with an aperture for receiving a sleeve 266 which is of hardened steel and the opening therethrough of a sufficient size only to permit a free passage of the wire so that the sleeve will co-act with the sliding bar 203 to shear the wire.

In the matter just set forth, the wire 220 is fed intermittently so that the sliding bar 203 may sever the same as the tying mechanism operates to provide a tying wire member for tying the ends of the skein together as well as for tying said ends to certain of the threads of the skein. This operation is repeated each time that a skein or supply of thread or yarn is wound on the reel 19. For some purposes this single tying mechanism is sufficient but while under other circumstances it may be desired to tie the skein together at a second point. In order to do this a duplicate tying mechanism is arranged on the diametrically opposite side to the tying mechanism just described for tying the skein together at the diametrically opposite side. This second tying operation is such that the tying wire encloses all of the strands of the skein because at this point they are all looped together and the wire may be easily forced thereover. As indicated in Figure 5, a tying structure 147' similar to the tying structure 147, is provided except that the casing 160' and associated parts are made longer in order to avoid certain mechanism not found on the opposite side of the machine. On this side of the machine the mechanism 18 is not necessary as there is no cutting or holding necessary and in fact, the tying operation is the only operation carried out. Preferably a mechanism 20' which is a duplicate of the mechanism 20 is provided to co-act with the auxiliary tying mechanism 147'. The casing 160' and associated parts are identical with those on the other side of the machine and will, therefore, need no additional description but will be provided with the same numbers for the purpose of identification.

After the skein has been properly wound on the reel 19 and tied on opposite sides of the reel as heretofore described, it is forced from the reel by the ejecting mechanism heretofore mentioned including the ejector 34 and, as it is forced off the pins 28 drops onto one of the hooks 21.

*Wrapper applying mechanism.*

The wrapper applying mechanism includes a construction provided with a number of the hooks 21 on which the tubes 25 are mounted, a wrapper projecting mechanism associated with the device carrying the hooks and a wrapper pulling mechanism preferably arranged on the opposite side of the machine to the wrapper projecting mechanism. The wrapper carrier structure 23 is provided with a stationary tubular support 267 (Figures 6 and 8) and in this structure is positioned a rotatable shaft 268, which shaft is keyed or otherwise rigidly secured to a comparatively large gear wheel 269 arranged beneath the plate 270 bolted or otherwise rigidly secured to the base 14. The gear wheel 269 and, consequently, the shaft 268 are intermittently moved as shown in Figures 8 and 36 and as hereinafter fully described. The tubular support 267 carries a collar 271 rigidly secured thereto by a suitable set screw 272, said collar having extensions or arms 273 and 273' for supporting the members 274. The tubular support 267 extends only a short distance above the collar 271 and preferably carries a fiber washer 275 on which the enlargement 276 of the shaft 268 rests. The hub 277 of the disk 278 fits loosely over the extension 279 of shaft 268 to which it is secured by a suitable set screw so as to rotate therewith. The disk 278 is provided with a number of radially disposed bores 280 merging into enlarged bores 281, there being shown in the accompanying drawings twelve, though a greater or less number might be used if desired. In each of the bores 280, the inner end of one of the hooks 21 is rigidly secured by a set screw and on each of the hooks 21 is arranged a sliding tube 25 to which is rigidly secured a block 282 having a depending pin 283. A spring 284 is arranged in the bore 281 and bears continually against the block 282 to cause the same to move outwardly and, consequently, to cause the tube 25 to slide over the hooks and entirely cover the same. However, when a skein is being supported by a hook, the tubes 25 will merely press the skein against the hook end 21' and pinch the same so that it will be held on the hook while a wrapper is being slid thereover as hereinafter fully described. The various springs 284 in the bores 281 tend to move the tubes 25 outwardly while a cam plate 285 acts to move the blocks 282 and the tubes 25 inwardly as they approach the reel 19 and also as they approach the discharge point.

Figure 4:
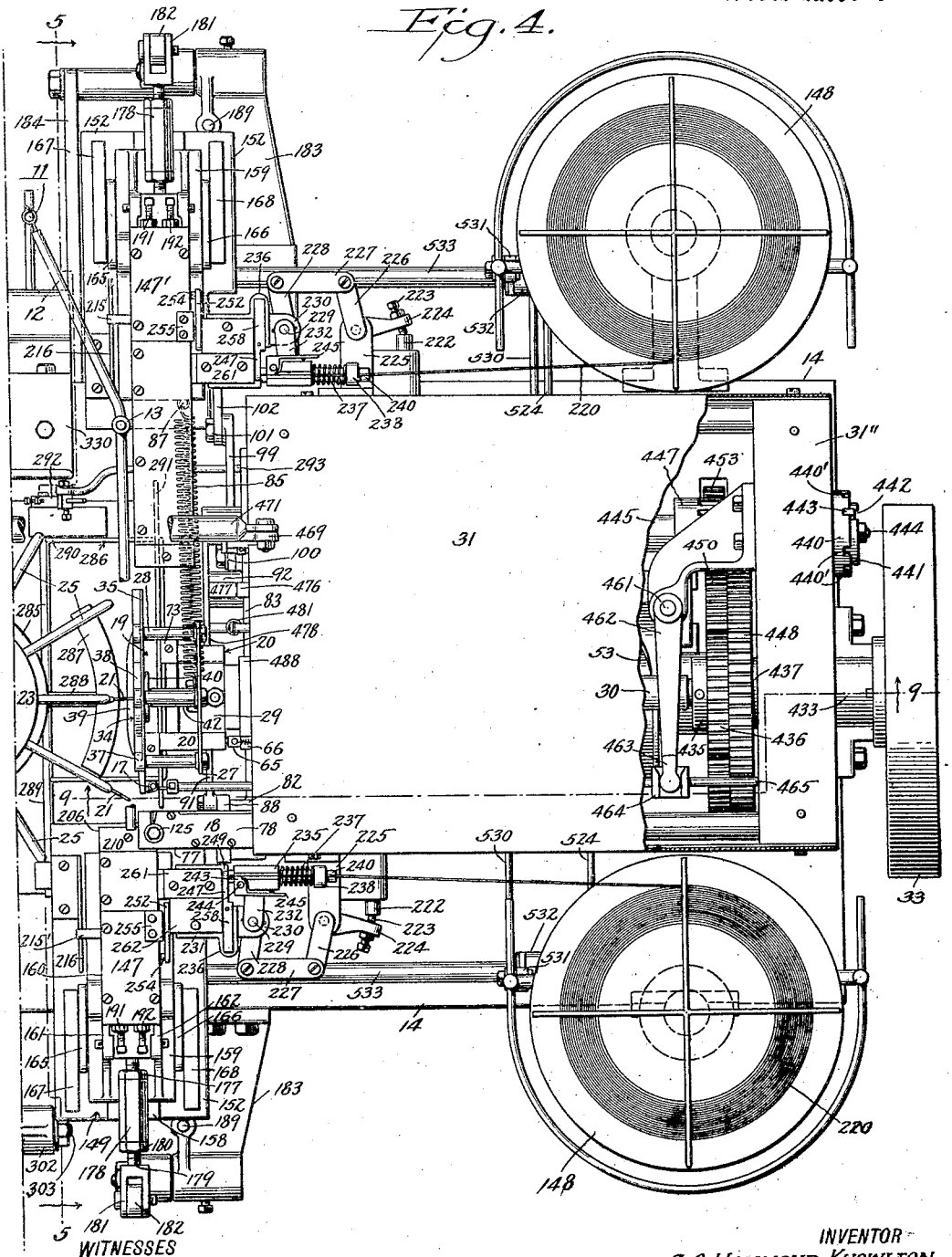
Figure 4 is a top plan view of that half of the skeining machine shown in Figure 2.

From Figure 16, it will be seen that the cam plate 285 crowds the pins 283 and associated parts inwardly at the proper time and then permits the springs 284 to move them outwardly. The cam plate 285 and associated parts are so arranged as to move the respective tubes 25 inwardly or towards the driving shaft 268 when the respective hooks 21 reach a point opposite the center of the drum or winding reel 19 and also again when it reaches a diametrically opposite position whereby the skeins are released preparatory to being transferred to a skein receiving structure hereinafter fully described. It will thus be noted that the hooks 21 are in proper position on one side for receiving the skein and are properly positioned on the opposite side for discharging the skein. When in their receiving position, namely, next to the reel 19, the ejecting structure heretofore described forces a skein thereover and said skein drops thereon by gravity. In order to cause a positive disengagement of the skein from the reel, a knock-off structure 286 (Figures 4 and 5) is provided. This structure co-acts with an arc-shaped guard or shelf 287 (Figures 16 and 17) supported by a suitable arm 288 adjustably mounted in one of the cam supporting members 274. The arm 288 may be held in any desired position by a suitable set screw or other proper clamping means. Preferably, the guard 287 is arranged with its outer edge spaced inwardly from the end of the hook 21 a short distance so that the skein when properly positioned on the hook may freely extend downwardly and swing if desired. At approximately the same time as the skein drops on the hook 21, the knock-off mechanism 286 operates. This mechanism (Figures 4 and 5) is provided with a rock shaft 289 journaled in suitable bearings preferably carried by the plate 270. The rock shaft 289 carries a substantially U-shaped device 290 which may be a small bar or stiff wire with the top connected in any suitable manner with a bar or rod 291 which projects beyond the U-shaped structure so as to provide a greater width. A rocker arm 292 is rigidly secured to the rock shaft 289 and is operated by a reciprocating link or rod 293, which rod or link is operated by a mechanism hereinafter fully described. The link 293 is adjustably secured to the arm 292 whereby any desired rocking action may be secured. The parts are so proportioned and timed that the bar 291 acts to swing the lower end of the skein inwardly beneath the guard 287, that is, toward the shaft 268 at the same time that the skein drops from the hook 21. As soon as this occurs, the knock-off mechanism 286 moves back to the position shown in Figure 4 and the hook (and skein deposited thereon) will move over one-twelfth of a revolution so that a new hook will be presented to the reel. In this manner, successive skeins are deposited upon the hooks and these hooks are successively brought beneath the wrapper pulling mechanism 24. However, before the hooks reach the reel 19, they must pass the wrapper projecting mechanism 22.

Figure 1:
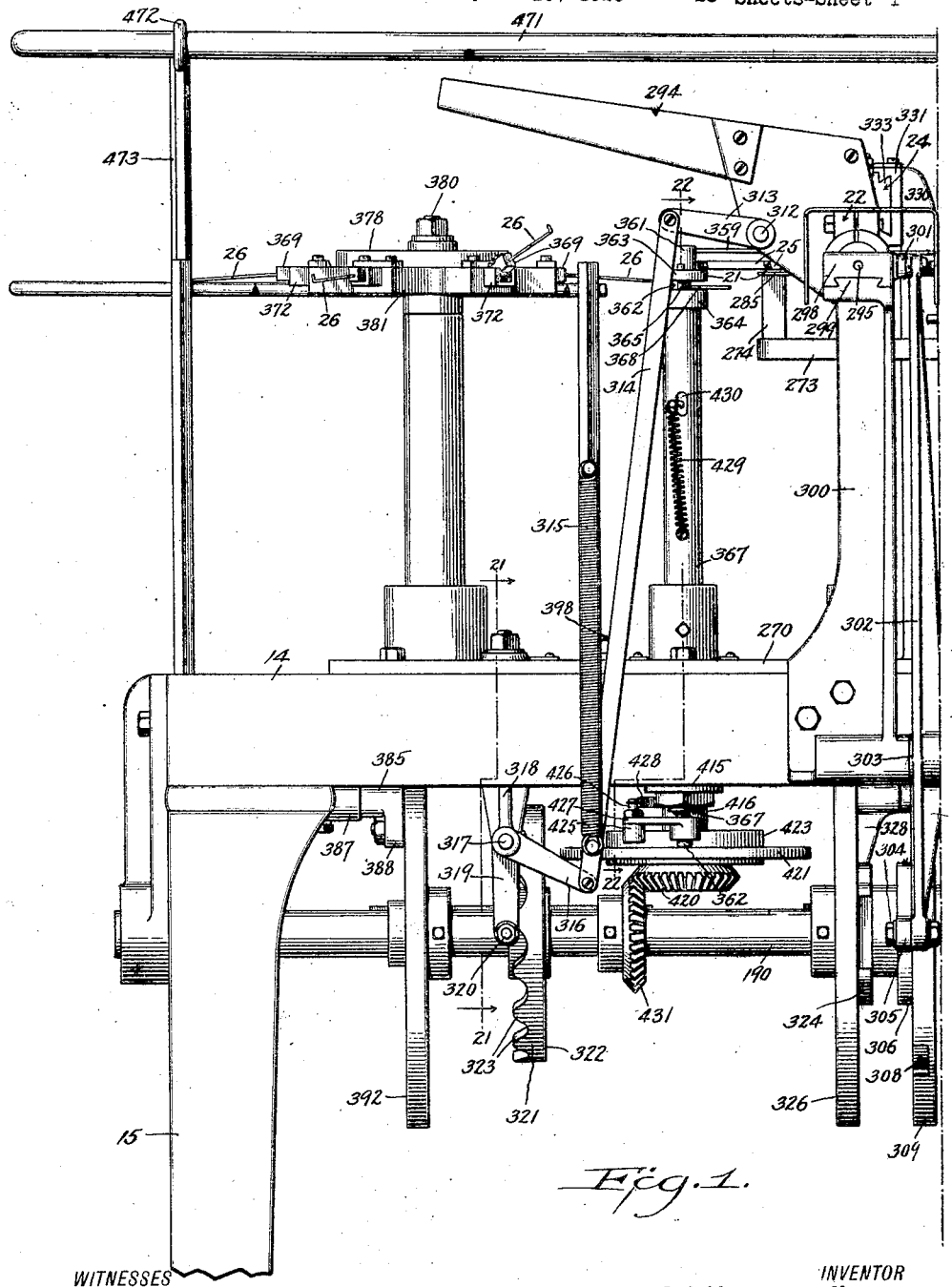
Figure 1 is a side elevation of approximately one-half of a skeining machine constructed according to the present invention.
Figure 6:
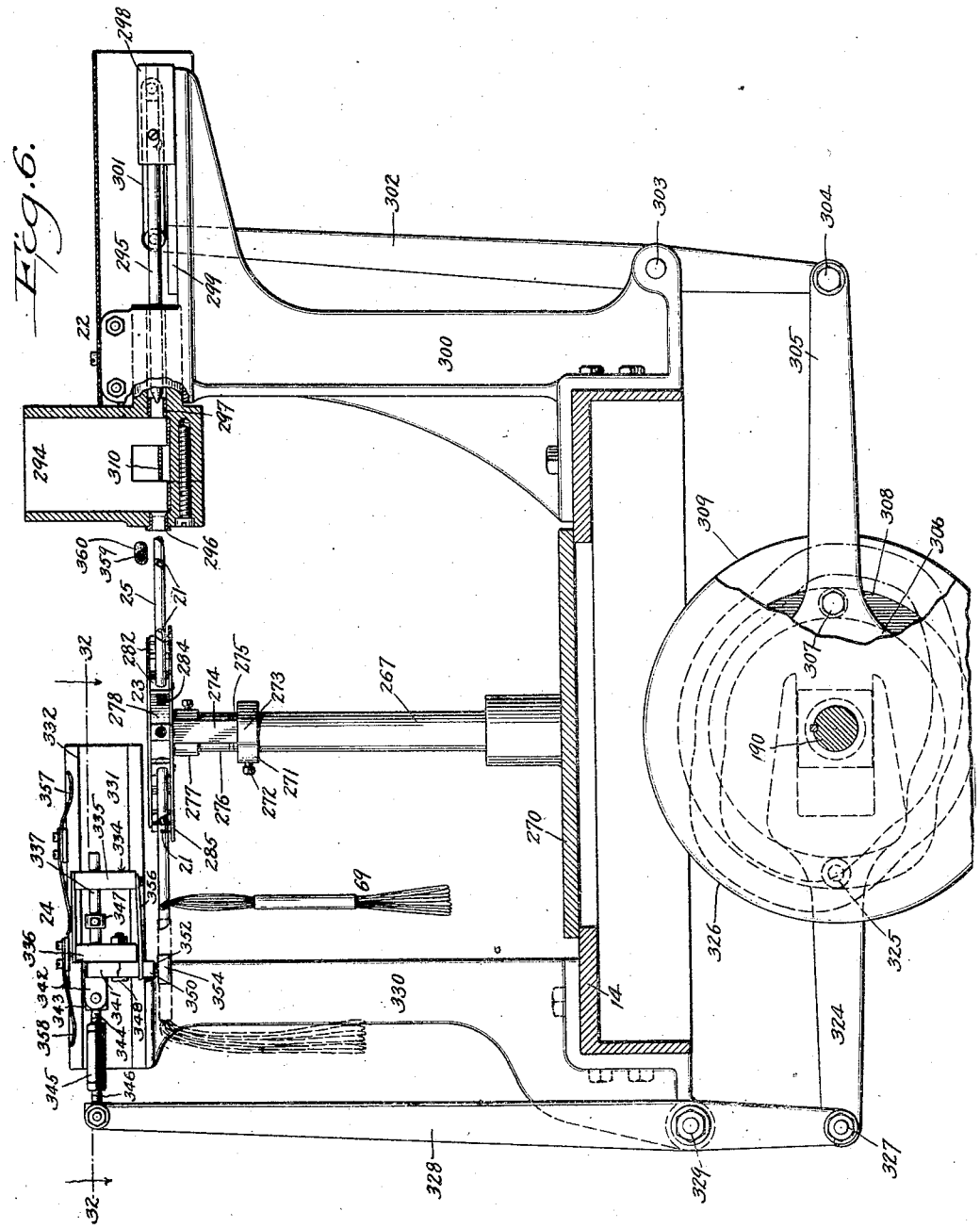
Figure 6 is a transverse sectional view through Figure 3 approximately on line 6—6.
Figure 13:
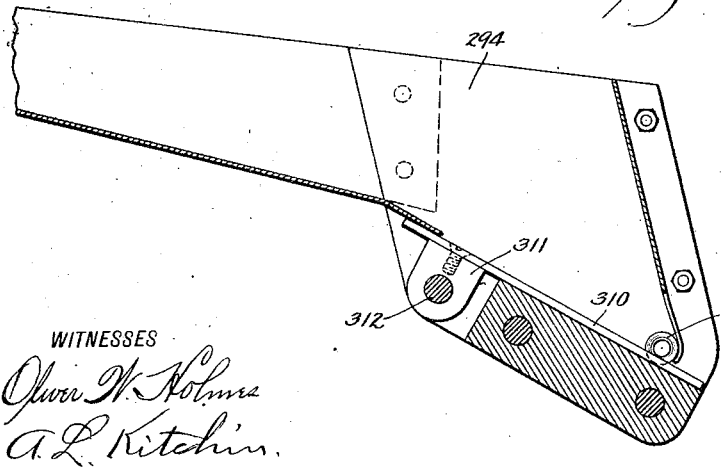
Figure 13 is a fragmentary enlarged sectional view through Figure 3 approximately on line 13—13, said view illustrating the construction of the wrapper hopper.

This mechanism more particularly shown in Figures 1, 6 and 13, acts to force wrappers onto the tubes 25. The wrappers are prepared in any desired manner and are deposited in the hopper or magazine 294 manually or by any desired mechanism, said wrappers being arranged as tubes when deposited in the hopper. These tubes naturally will move downwardly to the lowermost point in the hopper and as the lower part of the hopper is substantially a V-shaped structure, there will be only one wrapper at the bottom, which wrapper is engaged by the ejecting plunger 295 and forced through the guiding nipple 296 onto the tube 25 which is opposite this nipple. The ejecting plunger 295 is guided by a suitable guiding sleeve 297 and by a block 298 having a dove-tail groove co-acting with the dove-tail bead 299 carried by the bracket 300. A link 301 is pivotally connected to block 298 and also pivotally connected by a suitable pin to the upper end of lever 302, which lever is pivotally mounted at 303 to the bracket 300, said bracket 300 being bolted or otherwise rigidly secured to the base 14. The lower end of the lever 302 is pivotally connected at 304 to a thrust arm 305 provided with a bifurcated end 306 straddling a suitable squared block carried by the shaft 180. A suitable pin 307 is carried by the arm 305 and extends into a cam groove 308 of the cam wheel 309. If desired, the pin 307 may carry an anti-friction roller. By this construction and arrangement, it will be seen that the plunger 295 is timed to operate with the other mechanism and is actuated more or less directly from the driving shaft 190. In order that the labels may not become jammed in the hopper or magazine 294, an agitating tongue 310 is provided said tongue normally fitting against the bottom of the hopper as shown in Figure 13 but adapted to be swung upwardly as indicated in Figure 6. The tongue 310 is rigidly secured to a block 311, which block in turn is rigidly secured to a rock shaft 312, said rock shaft being journaled in the walls of the magazine 294 and also rigidly secured to an arm 313, which arm is pivotally connected with a link 314 acted upon by the retractile spring 315 for holding the same normally in a given position. The lower end of the link 314 is pivotally connected with an arm 316, which arm is rigidly secured to a shaft 317 journaled in the bracket 318 secured in any desired manner to the base 14. A second arm 319 is rigidly secured to the shaft 317, said second arm carrying at its lower end a pin 320, which pin preferably carries a roller, said roller engaging the upturned edge or flange 321 of the wheel 322. The flange 321 for part of its length is smooth and of the same height while for part of its length it is provided with corrugations 323 whereby the tongue 310 is swung upwardly and downwardly for about half the time and the remaining half of the time is left stationary and in engagement with the bottom of the hopper so as to permit the proper functioning of the ejecting plunger 295. The wheel 322 is keyed or otherwise rigidly secured to the shaft 190 so that the agitation of the labels in the magazine will always take place at the proper time and the agitating tongue 310 will be held stationary at the proper time.

During the operation of the machine, the ejecting plunger 295 forces a label in the form of a tube onto the tubes 25 as they intermittently come opposite the opening or sleeve 296. As the tubes 25 and their corresponding hooks 21 come opposite the center of the reel 19, a skein is deposited thereon and then by reason of the cam plate or ring 285, the tubes 25 are forced over the hook end 21′ whereby the skein cannot be pulled off of the hook. The parts are in this position when the skein reaches the wrapper pulling mechanism 24.

This mechanism, as illustrated particularly in Figures 3, 6 and 32 and 33 inclusive, is operated from the main shaft 190 through a push arm 324 acting through a pin 325 operating in a groove in the cam wheel 326. The arm 324 is pivotally connected at 327 to the lower end of the lever 328, which lever is pivotally mounted at 329 on the bracket 330, which bracket is bolted or otherwise rigidly secured to the base 14. The bracket 330 at the upper end carries a plate 331 provided with a dove-tail groove 332 adapted to accommodate the dove-tail bead 333 on the sliding carrier 334. This carrier is provided with outstanding arms 335 and 336, said arms having aligned apertures for accommodating the bar 337 which bar is preferably round and enlarged at 338, said enlargement having an inclined or beveled section 339 which acts as a wedge as illustrated in Figure 32ᵇ for permitting ready entrance between the arms 340 and 341. The enlargement 338 merges into a bifurcated end section 342 which receives the enlarged end 343 of the bolt 344 and a pin connecting said enlarged end with the bifurcated section 342. A turn buckle structure 345 is threaded onto the bolt 344 and also onto the bolt 346 which latter bolt is connected by a suitable pivotal bolt with the upper end of the lever 328. An adjustable stop 347 is mounted on the rod 337 and acts to limit the independent sliding movement of the rod 337. The arms 340 and 341, which are opened by the enlargement 338 are provided with suitable enlargements through which a pivotal pin or screw 348 extends, said screw being carried by the arm 336. From the enlargement through which the pin 348 extends, the arms merge into auxiliary arms 349 and 350, said auxiliary arms being provided with suitable bores for receiving the reduced shanks 351 and 352 of the grippers 353 and 354. The shanks 351 and 352 are clamped in place by suitable set screws or other clamping means and may be adjusted longitudinally of the auxiliary arms to vary the gripping action of the grippers 353 and 354. The auxiliary arms 349 and 350 are preferably provided with notches for receiving part of the respective springs 355 and 356, which springs are rigidly secured to arm 335 in any desired manner and act to move the auxiliary arms 349 and 350 together so that the jaws 353 and 354 will grip. If desired, the engaging or gripping face of these jaws may be roughened or may have some suitable material connected therewith, as for instance, emery cloth, rubber or the like to cause a better gripping action between the jaws and the wrappers, which wrappers are preferably paper.

Figure 3:
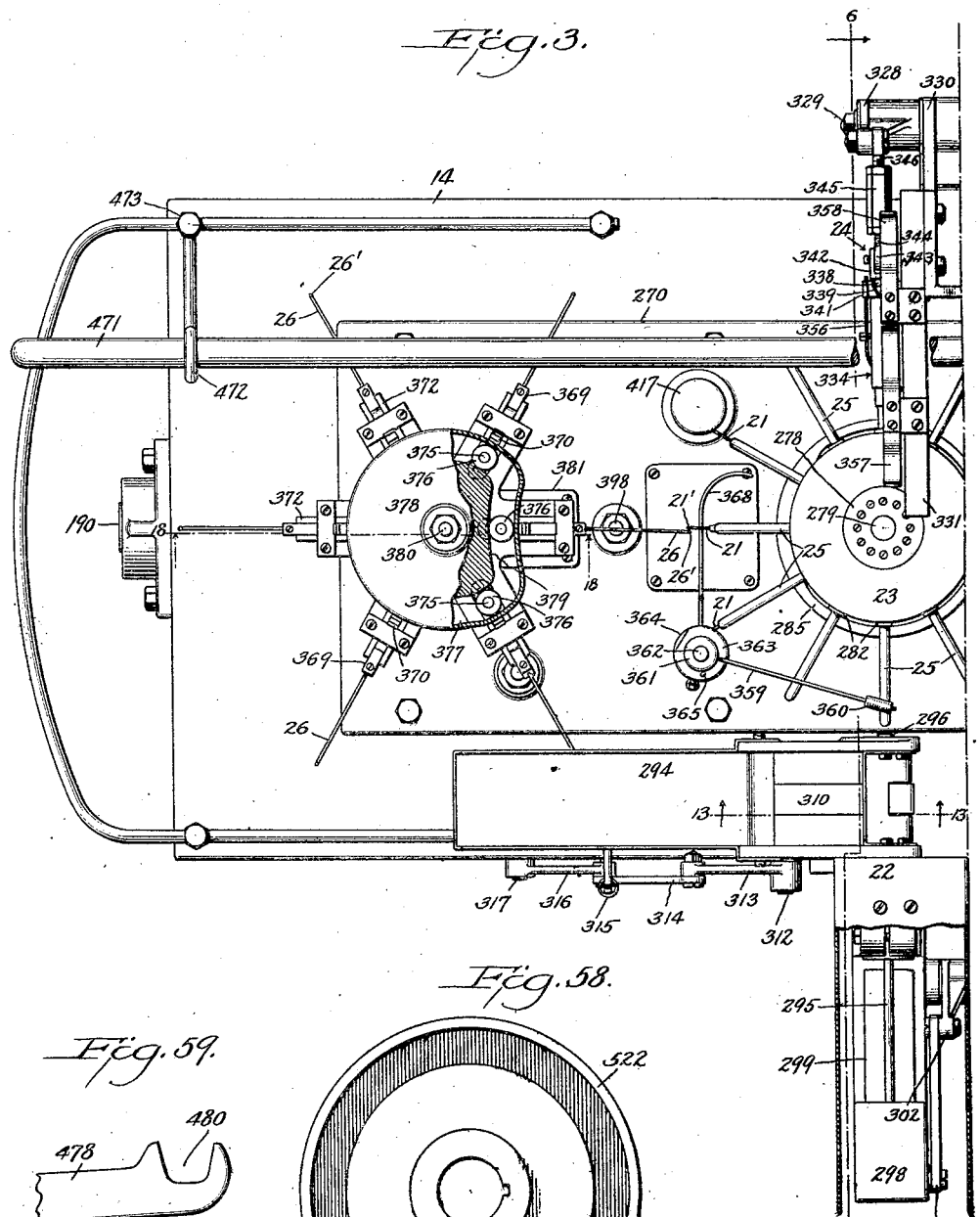
Figure 3 is a top plan view of that half of the skeining machine shown in Figure 1.

During the operation of the device, the rod 337 has a certain independent movement and in addition to this moves simultaneously with the sliding carrier 334, which carrier is retarded or somewhat resisted in its movement by the respective springs 357 and 358 which are connected in any suitable manner with the plate 331 and press against the carrier 334 as it moves past so that there will be no momentum and also no movement unless positively moved either by the pressure of the bifurcated end 342 or the action of the stop 347. As heretofore stated, a wrapper in the form of a tube is forced onto the tubes 25 as they come opposite the wrapper applying or ejecting mechanism 22. Sometimes the wrapper is not completely telescoped over the tubes 25 and to correct this occurrence, an auxiliary applying or wiping arm 359 is provided, said arm being supplied with a cushioning member 360 at the end which may be of cork, rubber or other material. The arm 359 moves against the wrapper and presses downwardly on the same and then moves so that the cushioning member 360 will pass substantially longitudinally of the tubes 25 for sliding the wrapper to its full position on the tubes 25. The arm 359 is rigidly secured to a collar 361 (Figure 22) which collar is rigidly secured to a vertically arranged shaft 362. A second collar 363 is also rigidly secured to the shaft 362 and is connected with a rotatable collar 364 by a pin 365. The collar 364 is rotatably mounted on the reduced end 366 of the stationary hollow standard or post 367. The collar 364 carries an arm 368 which is bent or curved as shown in Figure 3 and acts as an ejecting or discharge member for forcing the skeins off of the respective hooks 21 as they move to their discharge point, said skeins being forced onto the arms 26. The shaft 362 and associated parts co-acting therewith and for driving the same, will be hereinafter fully described.

After the wrapper has been thus completely applied, it moves by intermittent steps to a position opposite the reel 19 so that a skein may be forced onto the hook 21. The tubes 25 and the skeins carried by the hooks are then brought around as heretofore described to the wrapper pulling mechanism 24. When reaching the wrapper pulling mechanism, the skein is positioned as shown in Figure 17. As a particular skein moves to this position, the lever 328 (Figure 6) will move the wrapper pulling mechanism over until the jaws 353 and 354 are positioned approximately centrally of the tubes 25 and spaced therefrom on each side as indicated in Figure 33. When a reverse movement of lever 328 takes place the enlargement 338 moves from between the arms 340 and 341. This independent movement of this enlargement and rod 337 continues until the stop 347 engages the arm 336 whereupon the continued movement of rod 337 will cause the carrier 334 to move and, consequently, move the jaws 353 and 354 in a direction longitudinally of the tubes 25. It will be noted that as soon as the enlargement 338 moves from between the arms 340 and 341, springs 355 and 356 will act to force the jaws 353 and 354 into operative engagement with the wrapper mounted on the tubes 25. Being engaged with the wrapper and then moved longitudinally to the left as viewed in Figure 6, said wrapper will be pulled off of tube 25 and onto the skein, said skein being moved automatically to a substantially horizontal position for part of its length. This movement is continued until the label is positioned substantially centrally of the skein and then by a reversal of lever 328, the enlargement 338 will again move between the arms 340 and 341 and cause the jaws to move apart. This will permit the skein to drop downwardly but as one end is still engaged by the hook 21, it will merely swing from said hook but the label will be positioned centrally or intermediate the ends. As the machine continues to operate, the skein with its label, will eventually move to a position adjacent one of the arms 26 as shown in Figure 3 and will be discharged from the hook 21 by being lifted therefrom by the arm 26 assisted by the arm 368. The hook 21 then moves intermittently toward the wrapper ejecting mechanism 22 and so on for another cycle of operation.

*Skein receiving mechanism.*

The skein receiving mechanism as illustrated particularly in Figures 1, 3, 18, 19 and 20 is provided with six arms 26 though a greater or less number could be used if desired, each of said arms being operated by the particular mechanism shown to receive twelve skeins while in operative position. After any particular arm 26 has received twelve skeins it moves one-sixth of a revolution so that the next arm will be in operative position. This is continued as long as the machine is in operation. At some convenient point, the operator may manually remove the twelve skeins from any of the arms 26 at substantially any point, preferably at a point diametrically opposite the point nearest the wrapper receiving carrier 23. It is also evident that automatic means may be provided for removing the skeins from the arms 26.

The arms 26 are formed from stiff wire or a small bar and are preferably provided with a turned up end 26'. The inner end of the arm is clamped by a suitable set screw in what may be called a foot 369, which foot is provided with an extending projection or toe 370. The respective feet 369 are pivotally mounted in their respective positions by the pins 371, said pins being journaled in the side walls of channel-shaped plates 372, each of said plates having an integral section 373 at the inner end carrying a pin 374. These pins preferably are provided with enlargements 375 on which are rotatable rings 376, said rings fitting properly in a cam groove 377 of the cam plate 378. The groove 377 is partially circular but merges at point 379 into a substantially flat section which acts to pull the various channel plates 372 inward or toward the driving shaft 380. As the plates move inwardly, they will assume the position shown at the right in Figure 18 with the arms 26 arranged horizontally. While in this position, the arm 368 will force successively a number of skeins on arm 26, one skein being forced from each of the hooks 21 as the same approaches the arm 26. Immediately after a skein has been forced onto the arm 26, said arm is swung vertically a short distance and then allowed to drop back to its former position, said vertical swinging action being caused by the movement of the cam plate 378. The shaft 380 causes this movement by a mechanism hereinafter fully described. This swinging upwardly of the respective arms 26, as shown in Figure 19 occurs at the time each skein is deposited thereon and when the required number has been deposited, as for instance, twelve, that particular arm is moved one-sixth of a revolution as illustrated in Figure 3 and the next arm is brought to the operative position for receiving skeins. This next arm is acted on as just described as it receives the successive skeins and when it has received its quota, it also moves one-sixth of a revolution. This action is continued as long as the machine operates. There is provided as hereinafter described, mechanism for giving the cam plate 378 a back and forth motion and the spider structure 381 an intermittent rotary motion.

From Figure 18 it will be noted that the spider structure which supports the channel members 372, is keyed to the tubular shaft 382 and is moved thereby. As indicated in Figure 8, the shaft 382 is keyed or otherwise rigidly secured to the gear wheel 383 while a mutilated gear 384 is rigidly secured to shaft 380. The mutilated gear 384 meshes with a mutilated gear 385 rotatably mounted on a stub shaft 386 carried by a suitable bracket 387. The mutilated gear 385 is provided with an extension 388 carrying a pin 389, said pin preferably being supplied with a roller 390 operating in a cam groove 391 of the cam wheel 392, which cam wheel is keyed or otherwise rigidly secured to the driving shaft 190. The cam wheel 392 (Figure 49) is provided with a cam groove 391 having an arc-shaped section 393 arranged near the center of the cam and an arc-shaped section 394 arranged at a greater distance from the center of the cam wheel, said sections being connected by inclined sections 395 and 396 whereby the mutilated gear 385 will be swung in one direction as the roller 390 moves from section 393 to 394 and will be swung in the opposite direction as the roller 390 moves from section 394 back to section 393. This back and forth movement will rock the shaft 380 and will cause the arms 26 to be intermittently raised and lowered. As heretofore described, the spider 381 moves intermittently and by reason of the special mechanism shown in the drawing, makes one movement upon the completion of the depositing of twelve skeins on one of the arms 26. In order to secure this movement in the proper time, gear wheel 383 is connected rigidly with the tubular shaft 382 which is keyed or otherwise rigidly secured to the spider 381. The gear wheel 383 is continually in mesh with a gear wheel 397 rotatably supported by a suitable journal pin 398 carried by the plate 270. The gear wheel 397 is in line with the combined star wheel and gear wheel 269. The wheel 269, as shown particularly in Figures 7 and 36, is provided with a short section of teeth 399 which upon each revolution of the wheel 269 acts on the gear wheel 397 for partially rotating the same. This movement is sufficient to rotate the gear wheel 383 one-sixth of a revolution where it is temporarily locked by reason of the notched locking wheel 400, said locking wheel having six notches 401 adapted to receive the enlargement 402 of the locking lever 403. This lever is pivotally mounted as shown in Figure 36 on a suitable support and is acted upon by a spring 404 whereby it normally resists movement in one direction. The wheel 269 in addition to having the teeth 399, is provided with a cut-out portion or recess 405 arranged adjacent the teeth 399 whereby one of the points of the star wheel 406 may enter the same and permit the wheel 397 to rotate, said star wheel being rigidly secured to said gear wheel 397. The star wheel 406 will permit the wheel 269 to continue to rotate but will not permit the gear wheel 397 to rotate until the notch or recess 405 again approaches the star wheel as the teeth 399 approach the gear wheel 397. An auxiliary star wheel 407 is rigidly secured to the wheel 269 by screws or any other desired means so as to rotate therewith and in fact to rotate the wheel 269 intermittently, each movement being one-twelfth of a revolution according to the mechanism illustrated though the successive movements could be greater or less if desired without departing from the spirit of the invention.

As indicated particularly in Figure 36, the star wheel 407 is provided with a plurality of radially arranged notches 408 and a plurality of arc-shaped notches 409 co-acting therewith. Co-acting with this star wheel is a lever or swinging arm 410 (Figure 22) rigidly secured to the shaft 411. The arm 410 carries an arc-shaped member 412 which may be termed a guard to prevent the rotation of the wheel 407 until positively operated by the roller 413 carried by the pin 414, which pin is rigidly secured to the arm 410. As there are twelve notches 408, it will be noted that for each rotation of the arm 410 and shaft 411, wheel 407 will be moved one-twelfth of a revolution and will be held against movement at other times by the guard 412. The shaft 411 is rotatably mounted in a fitting 415 having a depending hub portion 416, said fitting being supported by the hollow post 367 and by a bolt 417. Suitable spacing sleeves 418 and 419 are provided so that the bolt 417 and the post 367 may be properly tightened up by the clamping nuts carried thereby so as to be held in proper position and at the same time rigidly hold the fitting 415 in a given position. Secured to the lower end of shaft 411, is a bevel gear 420 to which is rigidly secured a cam wheel 421 having a horizontal cam face 422 designed to act on the shaft 362 which carries the wiping arm 359 whereby said arm is lowered as is comes in contact with one of the tubes 25 and held lowered until it has been swung the desired distance, after which it is again raised. The cam wheel 421 is also provided with an upstanding cam section 423 having an outwardly extending section 424 adapted to act upon the roller 425, carried by the pin 426, which pin is clamped to the arm 427 and said arm in turn is rigidly clamped by a set screw or other suitable means to the shaft 362. A retractile spring 428 acts on the pin 426 to hold the roller 425 against the upstanding cam section 423. By reason of this construction, as the cam surface 422 begins to function, the outwardly extending section 424 will also begin to operate the arm 427 so that as soon as the wiping arm 359 is lowered it will begin to swing by reason of the action of the extension 424. The lower end of the shaft 362 is held in contact with the cam surface 422 and also the upper surface of the cam wheel or member 421 by a retractile spring 429 which has one end connected to the post 367 by a suitable pin and the other to the shaft 362 by a pin extending through an aperture 430. It will thus be seen that as the shaft 411 rotates, the wiper arm 359 and associated parts will function and also the shaft 268 will move in proper time therewith by reason of the action of the star wheel 407 and associated parts. The bevel gear 420 rotates continuously by reason of the fact that it is continually in mesh with a bevel gear 431 keyed or otherwise rigidly secured to the driving shaft 190.

*General driving mechanism.*

In order to operate the various mechanisms heretofore described, there is provided what may be termed a general driving mechanism, an upper auxiliary driving mechanism and a lower auxiliary driving mechanism. The general driving mechanism may receive power from any suitable source through a belt or other power transmitting devices. As shown in the accompanying drawings, it is intended to receive power from an electric motor or other suitable source through a belt, which belt is mounted on a pulley wheel 33, said pulley wheel being keyed or otherwise rigidly secured to the sleeve 433 (Figure 10). The stub shaft 32 carrying the sleeve 433, is preferably rigidly fitted into an opening in the wall 31″ and extends beyond that frame a short distance, said extending portion being reduced, provided with a bore 434 and with a threaded section for receiving a nut 435, said nut holding a pinion 436 in place, said pinion having an extending hub 437 surrounding the reduced inner extension of the shaft 32. The sleeve 433 has a pinion 438 formed integral therewith though it could be made separate and rigidly secured thereto. This pinion is in continuous mesh with a gear wheel 439 keyed or otherwise rigidly secured to the sleeve 440 which is provided with a number of notches 440′, there being eight notches shown in the particular illustration in the accompanying drawings, though a greater or less number could be used. Threaded onto the hollow shaft 445 is a clutch sleeve 441, which clutch sleeve is also fitted into a slight recess in the sleeve 440 so that the diametrically oppositely positioned notches 442 in sleeve 441 may be brought opposite the notches or apertures 440′ at different times. A clutch bar 443 is clamped onto the shaft 444 by a suitable nut so that it may be reciprocated by said shaft and brought into engagement with the respective notches 440′ and notches 442 whereby the clutch sleeve 441 and the sleeve 440 are locked together and, consequently, the shafts 444 and 445 will be caused to rotate as the gear wheel 439 is rotated. The sleeve 440 is preferably supported by a suitable bearing collar 446 which is carried by a wall 31″, said collar also acting as a bearing for the shaft 445. A pinion 447 is rigidly secured to the shaft 445 by a key, set screw or other suitable means, said pinion being continually in mesh with a gear wheel 448 fitted onto the hub 437 of the pinion 436 and rigidly secured to said pinion 436 by any suitable means, as for instance, a clamping screw 449. The pinion 436 (Figure 9) is continually in mesh with a large gear 450 which is journaled on a shaft 451 and to which it is secured in any desired manner, as for instance, by a set screw 452 whereby said shaft is rotated. The shaft 451 is journaled in suitable journal boxes in the frame 31 and carries a number of cams illustrated in Figures 9 and 10 and hereinafter fully described. The gear wheel 450 is continually in mesh with an idler gear 453 journaled on a suitable stub shaft 454 carried by the base 14. The idler gear 453 is continually in mesh with the gear 455 keyed or otherwise rigidly secured to the driving shaft 190. This driving shaft extends longitudinally and preferably centrally of the machine from one end to the other beneath the base 14, said shaft being supported by suitable brackets depending from the base 14.

Figure 11:
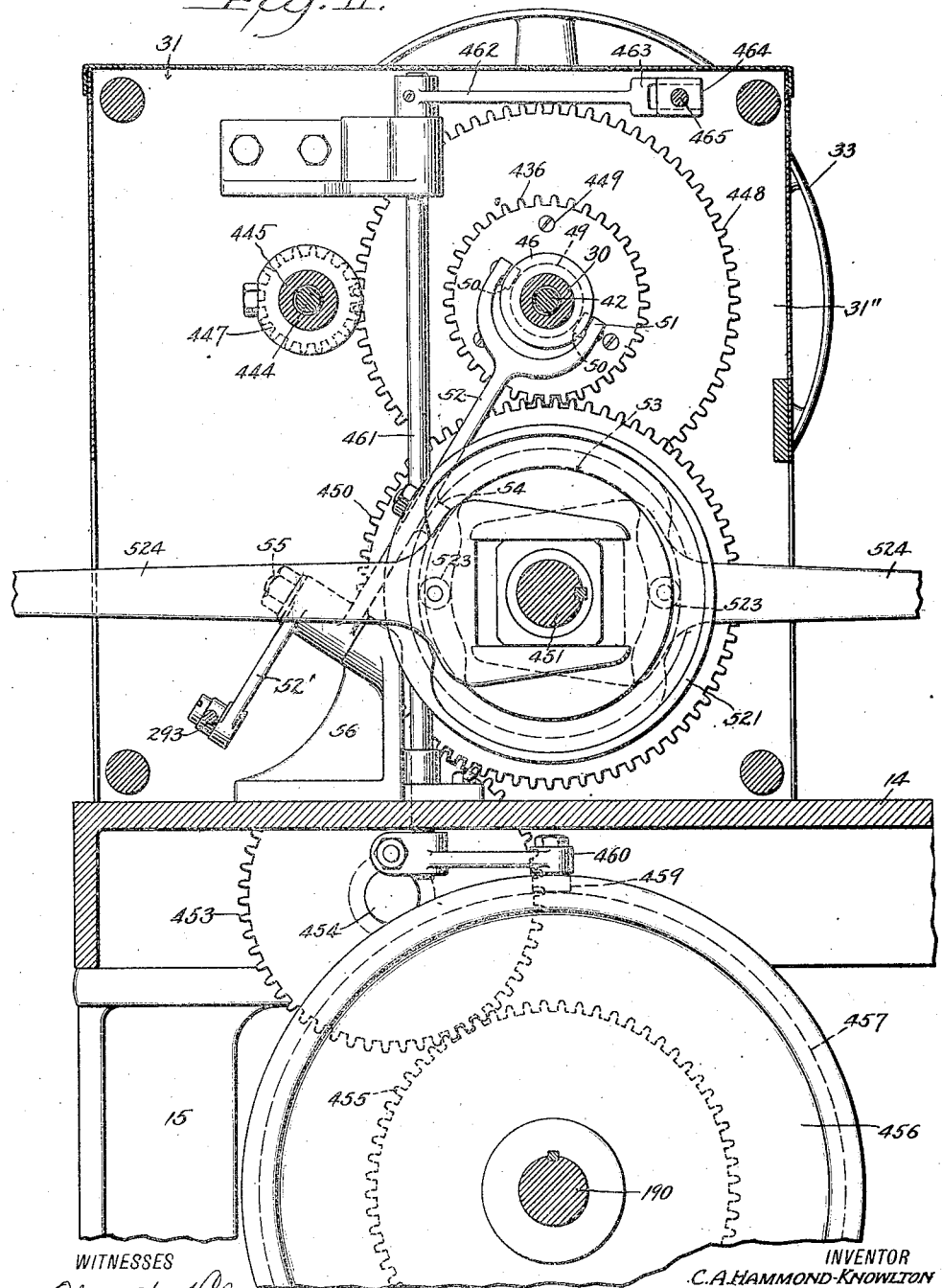
Figure 11 is a transverse sectional view through Figure 9 approximately on line 11—11.

The shaft 190, as heretofore set forth, carries the cams 392, 322, 326, 309, 187, 95 and 110 as heretofore described, said cams being keyed or otherwise rigidly secured to the shaft. In addition, the shaft 190 carries a cam 456 (Figure 2) which is provided with a cam groove 457 having offset sections or portions 458 whereby the roller 459 will be moved to one side and, consequently shift the arm 460 a short distance, said shifting action rocking the shaft 461 as arm 460 is rigidly secured thereto. The shaft 461 is journaled in suitable brackets as indicated in Figure 11 and carries an arm 462 at the upper end, said arm having a bifurcated end portion 463 designed to receive the movable block 464, said block having rigidly secured thereto a rod 465, said rod extending through the walls 31' and 31" and carrying at one end the eye 17. By reason of the action of the cam 456 (Figure 2), the eye 17 will be moved back and forth a desired number of times as the roller 459 moves in the offset portions 458. As all of the cam wheels are connected rigidly to the shaft 190, the parts will be properly timed as said shaft is driven from the same driving pulley as the other parts of the machine. It will also be noted that the lower auxiliary driving mechanism not only includes the shaft 190 and the various cams just described but certain gears and associated parts illustrated particularly in Figures 7, 8 and 36.

*Upper auxiliary driving mechanism.*

When the general driving mechanism is operating, the shaft 445 will be rotated through the action of the various gearing and associated parts heretofore described of said general driving mechanism and as this shaft rotates it will rotate the gear wheel 466 rigidly secured to the shaft 445 by set screws or other suitable means. In connection with the shaft 445, it will be noted that the same is hollow and carries the shaft or rod 444 which has a pair of spaced stops 467 at the end opposite the clutch mechanism, said spaced stops accommodating the bifurcated end 468 of the lever 469, said lever being pivotally mounted at 470 on a suitable member carried by the wall 31'. The upper end of the lever 469 is pivotally connected with a manually actuated rod 471 extending to the opposite end of the machine to that carrying the pulley wheel 33. The manually actuated rod 471 is supported by the pivotal connection with lever 469 at one end and at the opposite end it is slidingly mounted in a guiding eye 472 carried by a suitable standard 473 rigidly secured in any desired manner to the base 14. By this construction and arrangement the operator who removes the finished skeins from the arms 26 may readily grasp the end of rod 471 and shift the same for throwing in and out the clutch which consists of members 440, 441 and 443. As the clutch sleeve 441 has only two notches 442, the clutch bar 443 cannot be thrown into engagement except on each half revolution of the sleeve 441.

In addition to this arrangement of throwing in the clutch, means have been provided for preventing the operator from throwing out the clutch except at the end of the winding operation of a skein whereby the reel 19 can be only thrown in or out at the beginning or at the end of any given winding operation. In order to accomplish this result, a locking lever 474 (Fig. 5) is pivotally mounted at 475 to the wall 31' and falls by gravity to the position shown in Figure 10 whereby the end of lever 469 cannot be shifted inwardly or toward the wall 31' and, consequently, the clutch cannot be thrown out. A link 476 is pivotally connected to the lever 474 and acts as a combined weight and guide therefor, said link having a bifurcated lower end straddling a pin 477 carried by an arm 478, said arm being rigidly connected to a shaft 479 and provided at its free end with an arc-shaped notch 480. The notch 480 is adapted to partially enclose one of the pins 28 of the reel 19 to prevent any accidental movement of the reel. A spring 481 is connected with the pin acting as the pivotal support 475 and with the arm 478 for tending to raise said arm to the position shown in Figure 5 and, consequently, to rock the shaft 479 so that the arm 482 (Figure 12) rigidly secured to shaft 479 will be rocked for pressing the roller 483 carried by the outer end of arm 482 against the cam face 484. This cam face is of such a shape that for approximately half the revolution of the cam, roller 483 is held in an inner position and the arm 478 is assuming the position shown in Figure 5 while for approximately the other half of the revolution of the cam, roller 483 is moved to an outer position and held in said outer position and, consequently, the shaft 479 is rocked for moving the arm 478 out of engagement with the pin 28. The cam 484' is rigidly secured in any desired manner to the shaft 451 and is continuously rotated at a constant speed during the operation of the machine. When the arm 478 is moved out of engagement with the pin 28, the support for the link 476, namely, the pin 477, will move downwardly and permit the lever 474 to drop down against the shaft 444 and, consequently, act as a stop for preventing the movement of said shaft in one direction and thus preventing unclutching of the clutching mechanism.

When the clutching mechanism is engaged as shown in Figure 10 and the pulley wheel 33 is rotating, power will be transmitted to the hollow shaft 445 and as gear wheel 466 is secured thereto, said gear wheel will be rotated and in turn will rotate the pinion 485. This pinion is provided with a hub 485' on which a guarding disk 486 is mounted and also on which a friction member 487 is also mounted, said friction member being preferably of fiber and held in position by reason of the threads on the hub 485'. It will be noted that the pinion 485 rotates freely on the sleeve 488 which extends through the wall 31' and is secured thereto by suitable screws 489 (Fig. 9). A nut is carried at the inner end of sleeve 488 for holding the pinion 485 against the bearing structure 490 which is of any approved ball bearing type. The sleeve 488 acts in the capacity of a bearing and supporting sleeve and not only supports the pinion 485 and certain other members but also acts as a bearing for the shaft 30, said shaft in turn acting as a bearing for the ejecting shaft 42 which is operated by the bar 45 as heretofore described. It will be noted that the bar 45 as heretofore described is moved as the cam wheel 53 rotates, said cam wheel being keyed or otherwise rigidly secured to the shaft 451. It will be noted from Figures 4, 5 and 10 that the lever 52 is pivotally mounted at 55 on the bracket 56 and that the outer end 52' is pivotally connected with the rod or link 293, which rod or link is pivotally connected with the lever or arm 292 for rocking the U-shaped device or frame 290. It will thus be seen that the U-shaped device or frame 290 begins to swing outwardly for pushing the lower end of the skein toward the shaft 21 as the ejector begins to recede or move inwardly. This will cause the lower end of the skein to leave the ejector without becoming tangled and in ample time to permit the reel to perform another operation.

Figure 12:
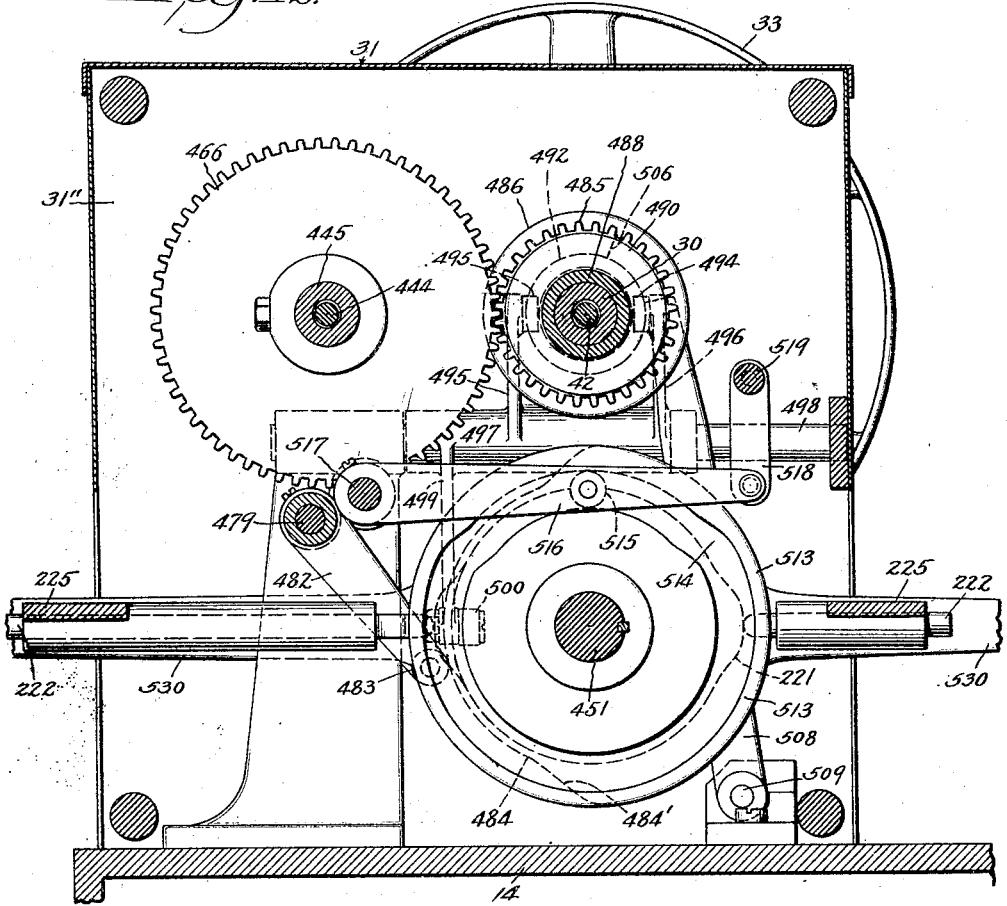
Figure 12 is a transverse vertical sectional view through Figure 9 approximately on line 12—12.

Referring again to the pinion 485, it will be observed that the same is provided with a hub 485' threaded externally for receiving the friction member 487. This friction member co-acts with the friction member or clutch 491, said clutch being provided with a hub 492 splined on the shaft 30 and pressed toward the friction member 487 by a spring 493, which spring is held under tension by suitable nuts as illustrated in Figure 10. The sleeve 492 is provided with an annular groove in which the respective rollers 494 operate, said rollers being mounted on the upstanding arms 495 and 496 of the sleeve 497 which sleeve is rotatably mounted on a transverse shaft 498 (Figure 12). The sleeve 497 is provided with a depending arm 499 carrying a roller 500 actuated by a cam 501 (Figure 50), which cam is provided with a flat surface 502 arranged in one plane and merging at 503 and 504 into a second or raised plane 505 whereby for half the time the cam will act to hold the lever 499 and associated parts including the arms 495 and 496 and the clutch 491 out of engagement for approximately half the time and then act to release these contacts so that the spring 493 will force the clutch into engagement for half the time.

In order that the shaft 30 shall stop instantly at a given point, the clutch 491 is provided with an enlargement 506 having a shoulder 507 which is engaged by a stop bar 508 at the completion of the winding of a skein and substantially at the same time that the clutch is disengaged from the friction member 487. The stop bar 508 is pivotally mounted at 509 and is provided with a pin carrying a roller 510, said roller operating in a groove 511 in a cam 512 (Figure 51). The groove 511 is of such a shape as shown in Figure 51, as to hold the bar 508 out of engagement with the enlargement 506 for a certain number of revolutions of the shaft 30 and for half a revolution of the cam 512. This construction and arrangement prevents any overlapping of any of the parts and provides an accurate stopping of the reel and associated parts so that the tying and cutting operation may properly function.

A cam 513 is keyed or otherwise secured to shaft 451 near the front wall 31', said cam being provided with a groove 514 accommodating a roller 515, which roller is pivotally mounted in any desired manner on the lever 516, said lever being in turn pivotally mounted on a suitable stub shaft 517. The outer or free end of lever 516 is pivotally connected to the outer end of the link 518, which link at its upper end is pivotally connected to a pin 519 rigidly secured in any desired manner to the cam plate 70 heretofore fully described. It will thus be seen that the cam 513 reciprocates the cam plate 70 and associated parts in proper time with the cutting and tying mechanism and associated parts. From Figure 9 it will be noted that the pin 519 moves in a suitable slot 520 provided in the front wall 31'.

A pair of cam wheels 521 and 522 are keyed or otherwise rigidly secured to the shaft 451. The cam wheel 521 operates the different parts associated with the wire cutting structure while the cam wheel 522 acts to form a loop on the wire after it is cut. It will be noted that these two cam wheels are double faced so as to act the same on both sides of the machine by reason of the tying mechanism for tying on diametrically opposite sides of the skein. The cam wheel 521 has a suitably formed groove for accommodating the roller 523 pivotally mounted on the thrust arm 524, said thrust arm having a bifurcated end straddling the hub of the cam wheel whereby it is guided. The outer or free end of the thrust bar 524 is pivotally connected to the upper end of an arm 525 (Figure 2), said arm having a hub 526 which is divided and which may be squeezed somewhat together so that it will rigidly clamp the rod 527 when the clamping bolt 528 is tightened. The cam wheel 522 is constructed substantially identically with the cam wheel 521 but faces in the opposite direction and accommodates the roller 529 pivotally mounted on the thrust arm 530 which thrust arm is pivotally connected at its outer end with an upstanding arm 531 similar to arm 525. The arm 531 is provided with a hub 532 similar to the hub 526 and is designed to clamp a tubular rod 533 when the clamping bolt 534 is tightened. It will, therefore, be seen that the arms 525 and 531 act as brackets connected with the rod 527 and 533 respectively.

Figure 2:
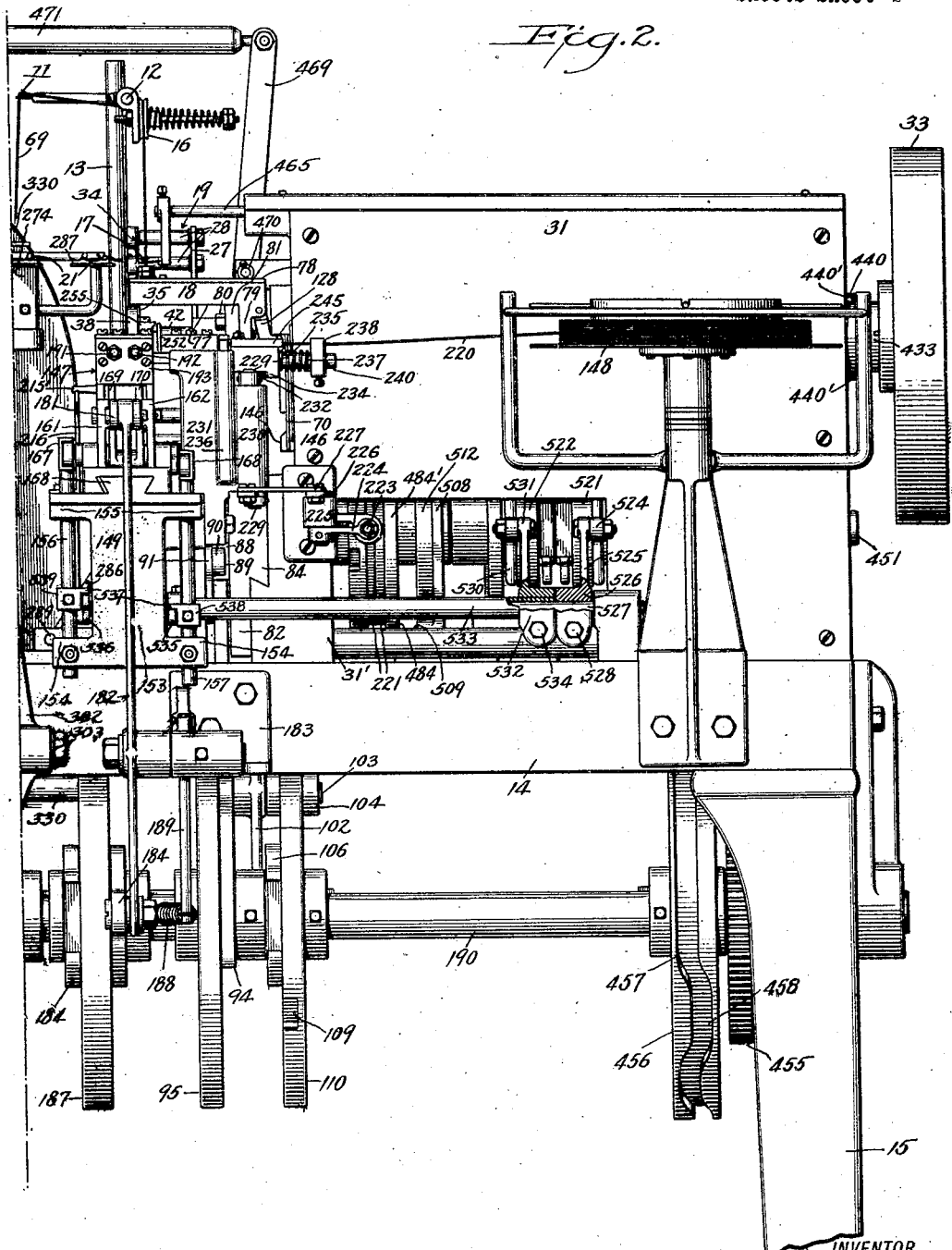
Figure 2 is a side elevation of the opposite half of the skeining machine illustrated in Figure 1.

The tubular rod 533 extends to a position below part of the tying mechanism as indicated in Figures 2 and 52, where it is rigidly secured to an arm 535. The rod 527 extends through the hollow rod 533 and also through the web 150 and on the opposite side of said web is rigidly secured to an arm 536 similar to arm 535. These arms extend below the overhanging lips 537 of the respective blocks 538 and 539 which blocks are rigidly secured to the vertical rods 156 and 157. It will be noted that as the arms 535 and 536 are swung upwardly by the respective rods 527 and 533, the respective rods 156 and 157 will be raised, said rods in turn raising the guides 167 and 168, which acting through mechanism more clearly shown in Figures 5, 14 and 15, compress the respective springs 173 and 174 so as to cause a section of the wire to be cut off as heretofore described and then cause the severed section to be looped or folded into a substantially U-shaped structure around the pin 205.

The various parts of the machine as described are intended to function in proper time and, consequently, the various cams and other parts are properly timed and proportioned to accomplish the desired result. When power is transmitted to the pulley 33, it will in turn transmit motion through the train of gearing particularly shown in Figures 2, 9 and 10 whereby the shaft 190 will be rotated at the proper speed, shaft 451 will be rotated at the proper speed, also the upper hollow shaft 445 will be properly rotated and from this shaft a proper speed of rotation will be communicated to the hollow shaft 30. It will be noted that when the clutch bar 443 is thrown out of engagement with its co-acting clutch members, the power will be disconnected from all of the shafts just enumerated and, consequently, all of the mechanism except the pinion 438 and gear 439 will stop. The shaft 190 will operate the various cams connected thereto and also certain gearing including the bevel gear 431 and associated parts (Figure 8) whereby the hooks 21 and associated parts will be properly operated and also the arms 26 and associated parts will be properly operated in the proper time. It will also be noted that the shaft 190 carries a number of cams which operate certain slides and other mechanism for actuating the cutting and tying mechanism with the help of the cam plate 70 and associated parts operated by certain cams carried by the shaft 451. The shaft 451 carries a number of cams operating at the same speed which are timed to properly function in connection with the cams carried by the shaft 190 and also with the action of the clutch 491 whereby the reel is permitted to rotate for half the time and remain still for half the time. While the wheel is remaining still, the cutting and tying mechanism at the right of the machine as shown in Figure 5 operates to cut the thread and to bind the ends thereof to part of the skein and together while the tying mechanism on the opposite side ties the entire skein together. The silk thread or other thread or yarn to be arranged into skeins is supported at any convenient place by any convenient means and is threaded through suitable guiding eyes to the eye 17 and from thence to the reel which winds measured lengths thereon intermittently. Each length is tied as heretofore described and forced onto one of the receiving hooks 21, after which the label is telescoped thereover and then it is removed by one of the arms 26 ready to be disposed of either by any suitable automatic machinery or manually by an operator.

During the operation of the machine some part of the machine is continually functioning so that a continuous output is provided which automatically acts to cut the thread into lengths, form the same into skeins, apply a label in the form of a tube thereon and then discharge the same at a given point.

What I claim is:—

1. A skeining machine, comprising means for guiding a thread from a supply, means for winding said thread into a skein, said guiding means acting to cause the winding means to wind a skein in two sections crossed at a given point, means for applying a binding member at said point of crossing, means for cutting the wound skein from the thread supplied so that the two ends of the skein will be in the same section, and means for applying a binding wire so as to surround the section containing the two ends and to clamp the two ends against accidental movement, said means acting when the winding means is stationary.

2. A skeining machine, comprising means for guiding a thread from a supply, means for winding said thread into a skein with two sections, said sections crossing at a given point, means for applying a tying member to one of said sections at substantially a diametrically opposite point to the point of crossing of the sections, and means for applying a tying member so as to surround the skein at the point of crossing.

3. A skeining machine, comprising a winding mechanism for winding a thread into a skein, means for forcing the skein off said winding mechanism, a carrier for receiving said skein, and means for applying a wrapper in the form of a tube to said skein while it is on said carrier.

4. A skeining machine, comprising winding means for winding a thread into a skein, a carrier for receiving said skeins, an ejector for ejecting the skeins from the winding means and discharging the same onto the carrier, means for supplying wrappers in the form of tubes to the carrier, means for applying the wrappers to the skeins while the skeins are on the carrier, means for removing the wrapped skeins from the carrier and assembling them in groups of certain numbers, an auxiliary driving mechanism for driving the winding means and the ejector, a lower auxiliary driving mechanism for driving the carrier and wrapper applying means, means for assembling the skeins in groups and a general driving mechanism for driving said auxiliary driving mechanism and said lower auxiliary driving mechanism.

5. A skeining machine, comprising a pair of thread guides, one of said thread guides being stationary and the other oscillated, winding means for winding said thread, said oscillating thread guide acting to guide the thread to the winding means so that it will be wound in two groups crossing at a given point, and mechanism arranged on diametrically opposite sides of the machine for supplying tying members to the skein while on the winding mechanism, one of said tying members being applied at the point of crossing so that all the strands will be included therein and the other of the tying members will be applied to one section, means for ejecting said tied skein, and means for applying a wrapper to said ejected skein.

6. In a skeining machine, a winding mechanism including a winding reel provided with a plurality of pins, an ejecting plate formed with openings through which said pins project, said plate being slidable longitudinally of said pins, a plurality of raised walls arranged on said plate acting to neutralize static electricity in the skein wound on said reel, and means for sliding said plate longitudinally of said pins for forcing a skein off of said pins when the reel is stationary.

7. In a skeining machine, an ejecting plate comprising a flat body formed with a plurality of pressed up portions having apertures therein and adapted to be positioned on the pins of a winding reel, and a plurality of upstanding webs extending in different directions acting to neutralize static electricity as a skein is being moved by the ejecting plate.

8. In a skeining machine, a winding mechanism including a winding reel, an ejecting plate carried by said reel, means for moving said plate axially in respect to the reel for forcing a skein therefrom, and a swinging frame for engaging the skein as the ejecting plate begins a reverse movement whereby the skein will not adhere to the ejecting plate.

9. A skeining machine, comprising a winding reel, means for ejecting a skein therefrom, a rockable member having a bar for engaging said skein and swinging the same away from the reel immediately after the skein has been ejected from the reel, an arm for rocking said rockable member, a substantially reciprocating link for actuating said arm, and means for actuating said link simultaneously with the ejecting means on said reel.

10. A skeining machine, comprising a winding reel, means for rotating said winding reel, means for guiding thread to said reel to be wound thereon, means for cutting said thread at spaced intervals, means for ejecting the wound skeins from said reel, a carrier for receiving said ejected skeins, means co-acting with the carrier for applying tubular wrappers to said skeins, and means for removing the skeins from the carrier after the wrappers have been applied.

11. In a skeining machine, a carrier for receiving skeins, said carrier being formed with a plurality of hooks on which the skeins are deposited, a tubular member surrounding each of the hooks, and means for moving the tubular member over the ends of the hooks and part of the skeins to lock the skeins on the hooks.

12. In a skeining machine, a carrier formed with a plurality of hooks, each hook being adapted to receive a skein as they move past a certain point, a tubular member carried by each hook, and cam means for forcing the tubular members over the ends of the hooks and part of the skeins immediately after the skeins have been deposited on the hooks, said cam means acting to hold the tubes over the ends of the hooks a predetermined length of time, and means for withdrawing said tubes to their former position with the ends of the hooks exposed so as to permit a ready removal of the skeins.

13. In a skeining machine, a carrier provided with a plurality of hooks adapted to receive skeins as they pass a given point, means for moving said hooks in a circle, a tube carried by each of the hooks, a cam structure for forcing the tubes over the ends of the hooks for locking a skein thereto and holding the same over the ends of the hooks for a given time, and a spring for retracting said tubes as they approach the point of discharge.

14. In a skeining machine, a carrier provided with a plurality of hooks adapted to receive skeins as they pass a given point, means for moving said hooks past said given point, a tube arranged on each of said hooks, means for supplying a wrapper in the form of a tube to each of the first mentioned tubes before they reach said given point, cam means for causing the first mentioned tubes to move over the ends of the hooks and lock the skeins thereto, said means holding the skeins locked for a given travel of the hooks, means for moving the wrappers off of the first mentioned tubes onto the skeins while the skeins are locked to the hooks, and means for moving the first mentioned tubes away from the ends of the hooks and from the skeins after the wrappers have been moved onto the skeins whereby the skeins with their wrappers may be readily discharged.

15. In a skeining machine, a carrier comprising a driven shaft, a hub or spider secured to said shaft and rotated thereby, a plurality of hooks rigidly secured to said spider and rotating therewith, a tube slidingly mounted on each of said hooks, a spring for forcing the tubes over the ends of the hooks, and cam means for moving the tubes against the action of said spring for uncovering the hook ends.

16. In a skeining machine, a carrier comprising a driven shaft, a stationary tube for holding said shaft in a given position while it rotates, a hub or spider rigidly secured to said shaft and rotated thereby, a cam plate rigidly secured to said tube, said cam plate being formed with a plurality of cam faces, a plurality of hooks secured to said spider, a tube slidably mounted on each hook, an operating head secured to each tube provided with a depending member arranged to engage said cam faces whereby as the spider rotates the tube will be moved radially inwardly according to the action of the cam faces, and a spring continually acting on the tubes for forcing the same outwardly.

17. In a skeining machine, means for forming skeins, a carrier for receiving said skeins, means for supplying wrappers in the form of tubes to said carrier, said means including a hopper and an ejector for forcing said wrappers onto the carrier before the skeins are supplied thereto, and means for moving the wrappers from said carrier to said skeins.

18. In a skeining machine, a wrapper supplying mechanism, comprising a magazine adapted to receive the wrappers in the form of tubes, means for ejecting one tube at a time from the magazine, and means for agitating the tubes immediately previous to the ejection of the tubes from the magazine.

19. In a skeining machine, a wrapper applying mechanism, comprising a magazine formed with a substantially V-shaped portion whereby the wrappers will gravitate toward the bottom of the V and thereby position automatically one tubular wrapper at the bottom, an ejecting plunger for moving the wrapper at the bottom of the magazine from the magazine, a tubular member for guiding the wrapper as it is forced from the machine, and means for agitating the remaining wrappers in the magazine after the plunger has been moved back to its former position whereby a new wrapper will automatically gravitate to the bottom of the magazine ready for ejection.

20. In a skeining machine, mechanism for supplying tubular wrappers, said mechanism including a substantially V-shaped magazine formed with a discharge opening, means for forcing wrappers through said discharge opening, means for agitating said wrappers after each discharge, said agitating means including a tongue normally forming part of the bottom of the magazine, and means for swinging said tongue back and forth in a direction at right angles to the axes of the wrappers.

21. In a skeining machine, a carrier provided with a plurality of label receiving members, a magazine for supplying labels to said members in a tubular form, a plunger for forcing wrappers from said magazine, means for actuating said plunger, and a wiping member engaging said wrappers as they leave the magazine for forcing them onto the carrier.

22. In a skeining machine, a carrier provided with a plurality of arms, a magazine co-acting with said carrier adapted to supply wrappers in the form of tubes onto said arms, a plunger for forcing wrappers from said magazine, means for actuating said plunger, and a swinging wiping member adapted to engage and force the wrappers onto the arms.

23. In a skeining machine, a carrier provided with a plurality of arms, means for forcing tubular wrappers onto said arms and a wiping mechanism for completing the forcing of the tubular wrappers onto said arms, said wiping mechanism including a rock shaft, means for raising and lowering said rock shaft, an arm carried by said rock shaft, and a friction member carried by said arm, said friction member being adapted to engage said wrappers and force the same longitudinally of the arms of the carrier when the rock shaft is moved in one direction and to be raised out of contact with the wrappers as the rock shaft is moved in the opposite direction.

24. In a skeining machine, means for forming a skein, a carrier provided with a plurality of arms, each arm being adapted to receive a skein from said skein forming means, means for applying skeins to said arms, means for supplying tubular wrappers to said arms before the skeins are applied thereto, and means for moving said tubular wrappers onto said skeins, said means including a pair of jaws for gripping the wrappers, and means for substantially simultaneously closing said jaws and moving the same longitudinally of the arms carrying the wrappers, said movement being continued until the wrappers have been entirely pulled off of said arms and onto the skeins carried by the arms.

25. In a skeining machine, means for forming a skein, a carrier provided with a plurality of arms adapted to receive skeins from said skein forming means, means for applying skeins to said arms means for supplying tubular wrappers to said arms before the skeins are applied thereto, and means for pulling said wrappers off of said arms onto the skeins, said means including a wrapper gripping structure, means for causing said gripping structure to grip the wrappers without crushing the same, and means for moving the gripping structure a sufficient distance to cause the wrappers to be positioned wholly on the skeins.

26. In a skeining machine, means for forming a skein, a carrier provided with a plurality of rotating arms adapted to successively receive skeins from said skein forming means, means for applying skeins to said arms, means for supplying said arms with tubular wrappers before the skeins are deposited on the arms, and means for sliding the wrappers from the arms onto the skeins, said means including a pair of wrapper gripping jaws, a pivotally mounted lever connected with each of said jaws, a cam for actuating said levers so as to cause the jaws to grip and ungrip, and an actuating member adapted to first actuate said cam and then move the levers operated thereby together with said jaws a predetermined distance.

27. In a skeining machine, a skein forming mechanism, a carrier provided with a plurality of arms adapted to successively receive skeins from said skein forming means, means for applying skeins to said arms, means for supplying tubular wrappers to said arms before the skeins are deposited on the arms, and means for moving the wrappers off of said arms onto the skeins, said last mentioned means including a pair of gripping jaws, a pair of pivotally mounted levers for actuating said jaws, a reciprocating carrier supporting said levers, an actuating rod provided with a cam and a stop, and means for moving said actuating rod, said cam and said stop being spaced apart whereby as the actuating rod is moved the cam will release said jaws and then move them longitudinally a predetermined distance, and spring means for causing said jaws to close when released.

28. In a skeining machine, a wrapper pulling mechanism, comprising a pair of jaws, a carrier for supporting said jaws, a cam for opening said jaws, spring means for closing said jaws, an actuating rod carrying said cam, a stop carried by the actuating rod and spaced from the cam, spring means for preventing said carrier from having any momentum, and power means for moving said actuating rod whereby when it is moved in one direction the cam will release said jaws and said stop will engage the carrier for moving the carrier and jaws a predetermined distance, said cam being actuated by the return of said power member in the opposite direction whereby the cam member will open said jaws.

29. In a skeining machine, mechanism for winding a thread into a skein, a carrier for receiving said skein, means for applying a wrapper to said skein while on the carrier, a skein receiving mechanism for receiving the skein from said carrier, said receiving mechanism including a hook for receiving the skein, and means co-acting with the hook for forcing the skein from the carrier as the skein moves to a certain point.

30. In a skeining machine, means for winding a thread into a skein, a carrier for receiving said skein, means co-acting with the carrier for applying a wrapper to said skein, a receiving mechanism for receiving said skein when the same is moved to a given point by the carrier, and a wiping mechanism for forcing the skein from the carrier onto the receiving mechanism, said wiping mechanism including an arm and mechanism for moving said arm back and forth.

31. In a skeining machine, means for forming a skein from a thread, a carrier for receiving said skein and a receiving mechanism for receiving the skein from the carrier as it reaches a given point, said receiving mechanism including a tilting arm formed with a stop on the outer end, and means for tilting the arm as each skein is deposited thereon for causing the skein to move by gravity along the arm toward its pivotal point and thereby make room for the next succeeding skein.

32. In a skeining machine, a skein receiving mechanism, comprising an arm having a stop at the outer end, a rotatable member for supporting said arm, means for pivotally mounting said arm on said rotatable member, and means for tilting said arm each time a skein is deposited thereon whereby the skein will move by gravity along the arm toward the pivotal point, said means for tilting including a reciprocating member slidingly mounted on said rotatable member and carrying the means for pivotally supporting said arm, a cam for moving said reciprocating member, and an abutment stopping one end of said arm before said reciprocating member stops.

33. In a skeining machine, a skein receiving mechanism, comprising a rotatable plate, a plurality of reciprocating arm supporting members arranged on said plate, a pivotally mounted arm carried by each of said arm carrying members, a stop carried by said rotatable plate adjacent each of said arm carrying members, and an actuating cam acting on the arm carrying members for reciprocating the same when they move to a given point, said cam reciprocating the arm carrying members sufficiently to cause the arms to strike said stop and be tilted thereby.

34. In a skeining machine, a skein receiving mechanism, comprising a rotatable plate, means for rotating said plate step by step, a plurality of arm carrying members arranged on said plate, a stop arranged adjacent each of said arm carrying members, an arm pivotally mounted on each of said arm carrying members provided with a hook adapted to strike said stop, and a cam acting on said arm carrying members when they reach a given point for intermittently reciprocating the arm carrying members sufficiently to cause the hook on said arms to strike said stop for tilting the same.

35. In a skeining machine, a skein receiving mechanism comprising a rotatable plate, means for rotating said plate step by step, a plurality of reciprocating arm carrying members carried by said plate, a stop carried by said plate extending across each of said members, an arm pivotally mounted in each of said members provided with a projection adapted to strike said stop as the arm and its carrying member are moved in one direction whereby the arm will be swung pivotally so that its outer end will move upwardly and thereby allow a skein deposited thereon to move toward the pivotal point of the arm, and a cam member acting on said arm carrying members for reciprocating the same each time a skein is deposited on said arm.

36. In a skeining machine, means for winding a skein from a supply, a cutting mechanism for cutting the wound portion of the thread from the supply, a pair of holding mechanism for holding the two ends of the thread which has been wound, and mechanism for applying an encircling tying member after the cutting mechanism has functioned to lock said ends in juxtaposition, said encircling tying member being applied while said ends are being held.

37. In a skeining machine, means for winding a skein from a supply of thread, means for gripping and holding one end of said thread before the skein is wound, means for gripping and holding said thread after the skein is wound at a point along the thread near the wound skein, means for cutting the thread between the holding means and the skein, and means for applying a tying member to the skein which will hold the ends of the skein in juxtaposition.

38. In a skeining machine, means for winding a reel from a supply of thread, a gripping and holding member carried by said winding means for gripping and holding the end of a thread while it is being wound into a skein, said gripping and holding means comprising a supporting block provided with a large movable co-acting jaw, a spring for causing said co-acting jaw to move toward the first mentioned jaw for gripping a thread therebetween, and a movable cam for moving said movable jaw against the action of said spring while the winding mechanism and gripping mechanism are stationary.

39. A skein forming machine, comprising a winding reel, means for intermittently operating said reel, means for feeding thread to said reel so that skeins may be wound thereon, means co-acting with the reel for cutting the supply thread from the wound skein, means for applying a tying member to said skein, said means including a semi-circular socket member carried by the reel said socket member being provided with a guide for holding the thread adjacent the socket member, and means for forcing a substantially U-shaped tying member into the socket member, said tying member being forced into the socket member with both of the legs engaging simultaneously the socket member first whereby as it is moved into the socket member the legs will be caused to bend and move past each other whereby it will encircle and tie a certain part of said skein.

40. In a skeining machine, means for forming a skein, means for applying a tying member to encircle all of the strands of the skein at one point and part of said strands at another point, said means including a mechanism for supplying a wire, means for cutting the wire off into lengths, means for bending the wire into a U-shape form, and means for bending said U-shaped wire around the skein.

41. In a skeining machine, means for winding a skein from a supply of thread and means for applying a tying member thereto, said last mentioned means including a pair of parallel pushing bars, one of said bars acting as a cutting member, a pushing plate arranged between said pushing bars, means for supplying a tying wire and forcing the same into the path of movement of said pushing bars, said pushing bars and said plate acting to move part of the wire forwardly to said skein, means intermediate the travel of said pushing bars for bending the wire into a U-shaped structure, a sliding plate connected to both of said pushing bars, a sliding plate connected to the plate arranged between said pushing bars, springs for holding said sliding plates in a retracted position, and means including a pair of swinging arms for moving said plates against the action of said springs.

42. In a skeining machine, means for winding a skein from a supply of thread and means for applying a tying member to said skein, said means including a plurality of sliding bars for moving the tying member to a tying position, a pair of sliding plates for actuating the different bars, a spring for intermittently holding each of said plates in retracted position, a pair of pivotally mounted levers for actuating said plates against the action of said springs, independent means for operating said levers in proper time, and means for bodily moving the levers, plates and associated parts to a position near the skein as the tying member is applied thereto and away from the skein after the tying member has been applied.

43. In a skeining machine, a winding reel, means for intermittently rotating said reel, means for guiding the thread to said reel whereby upon each operation of the reel a skein will be wound thereon, said reel being provided with a pin, a notched lever arranged adjacent said reel, a rock shaft for moving said lever into interlocked relationship with said pin whereby the pin is arranged in the notched lever, and a cam for moving said lever into locked position with the reel as soon as the reel stops, said cam acting to move the lever out of engagement with said pin immediately before the reel starts whereby the reel is locked against accidental movement unless positively driven.

44. In a skeining machine, a winding reel, means for feeding thread to the reel to be wound thereon, a main driving mechanism continuously operating, an auxiliary driving mechanism connected with said reel for rotating the same, said auxiliary driving mechanism being driven by said main driving mechanism, a friction clutch interposed between said reel and the auxiliary driving mechanism, and a positive stop co-acting with said clutch for stopping the rotation of said reel immediately upon the throwing out of said auxiliary clutch.

45. A skein forming machine, comprising a reel, means for guiding thread to said reel, means for intermittently rotating said reel, an auxiliary driving shaft arranged an appreciable distance below the reel, means connecting the driving mechanism of the reel with said auxiliary driving shaft for rotating the same, means for ejecting the skein from said reel, a carrier for receiving said skein, a plurality of means for supplying and applying a label to the skein while on the carrier, and means for receiving the finished skein from the carrier, means actuated by said auxiliary driving shaft for operating said carrier, and means operated by said auxiliary driving shaft for actuating said skein receiving means.

46. In a skeining machine, a winding reel adapted to wind a skein thereon, a movable thread guide for regularly shifting the thread as it is wound on the drum so that the finished skein while on the reel will be in two sections crossing at one point, means for holding the ends of said skein juxtapositioned in one of said sections, means for applying an encircling binding member to said last mentioned section so as to clamp the strands thereof together and hold the ends of the skein juxtapositioned, and a second binding applying means operating on the diametrically opposite side of the reel for applying and encircling the binding member to the skein at the point where said sections cross.

47. In a skeining machine, a winding reel adapted to wind a skein thereon, holding means carried by the reel for holding one end of the thread of said skein, a cam arranged adjacent the reel but not carried thereby for actuating said holding means to cause the same to release said end, a second holding means arranged at a distance from the reel, mechanism for moving the thread holding means to a point adjacent the reel for holding the thread at a second point, and means for applying a binding member to said skein, said means causing the binding member to encircle both ends of the skein and certain of the strands thereof.

48. A skeining machine, comprising a thread guide adapted to oscillate, winding means for winding said thread, said guide acting to guide the thread to the winding means so that it will be wound in two groups crossing at a given point and mechanism arranged on diametrically opposite sides of the machine for supplying tying members to the skein while on the winding mechanism, one of said tying members being applied at the point of crossing so that all of the strands will be included therein and the other of the tying members will be applied to one section, and means for ejecting said tied skein.

CLARENCE A. HAMMOND-KNOWLTON.